US012719533B2

(12) United States Patent
Jo et al.

(10) Patent No.: US 12,719,533 B2
(45) Date of Patent: Aug. 25, 2026

(54) DEVICE AND METHOD FOR PERFORMING MULTI-USER PRECODING IN WIRELESS COMMUNICATION SYSTEM

(71) Applicant: LG ELECTRONICS INC., Seoul (KR)

(72) Inventors: Minseok Jo, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 18/712,090

(22) PCT Filed: Sep. 22, 2022

(86) PCT No.: PCT/KR2022/014161
§ 371 (c)(1),
(2) Date: May 21, 2024

(87) PCT Pub. No.: WO2023/090615
PCT Pub. Date: May 25, 2023

(65) Prior Publication Data

US 2025/0030463 A1 Jan. 23, 2025

(30) Foreign Application Priority Data

Nov. 22, 2021 (KR) ........................ 10-2021-0161507

(51) Int. Cl.
*H04B 7/0456* (2017.01)
*H04B 7/0452* (2017.01)

(52) U.S. Cl.
CPC ......... *H04B 7/0456* (2013.01); *H04B 7/0452* (2013.01)

(58) Field of Classification Search
CPC ....... H04B 7/0456; H04B 7/0452; H04B 7/06
See application file for complete search history.

(56) References Cited

U.S. PATENT DOCUMENTS

2021/0342687 A1* 11/2021 Wang ....................... G06N 3/08
2021/0345399 A1* 11/2021 Levy .................... H04B 17/345

* cited by examiner

*Primary Examiner* — Ayanah S George
(74) *Attorney, Agent, or Firm* — BRYAN CAVE LEIGHTON PAISNER LLP

(57) ABSTRACT

The present disclosure is to perform multiuser precoding in a wireless communication system. A method of operating a device for performing multiuser precoding in a wireless communication system may comprise transmitting configuration information related to channel state information (CSI) feedback to candidate devices, transmitting reference signals corresponding to the configuration information, receiving CSI feedback signals from the candidate devices, determining precoding vectors for participating devices that are at least part of the candidate devices, performing precoding for data to the participating devices using the precoding vectors, and transmitting the precoded data. The participating devices may be determined based on information including magnitude values of precoding vectors for the candidate devices determined by a decoder neural network based on the CSI feedback signals generated by an encoder neural network.

20 Claims, 23 Drawing Sheets

Device(300)

Communication unit(310)
(e.g.,5G Communication unit)

Communication circuit(312)
(e.g.,processor(s),Memory(s))

Transceiver(s)(314)
(e.g.,RF unit(s),antenna(s))

Control unit(320)
(e.g.,processor(s))

Memory unit(330)
(e.g.,RAM,storage)

Additional components(340)
(e.g.,power unit/battery, I/O unit, driving unit, computing unit)

DEVICE AND METHOD FOR PERFORMING MULTI-USER PRECODING IN WIRELESS COMMUNICATION SYSTEM

CROSS-REFERENCE TO RELATED APPLICATIONS

This application is the National Stage filing under 35 U.S.C. 371 of International Application No. PCT/KR2022/014161, filed on Sep. 22, 2022, which claims the benefit of earlier filing date and right of priority to Korean Patent Application No. 10-2021-0161507, filed Nov. 22, 2021, the entire contents of which are incorporated herein for all purposes by this reference.

TECHNICAL FIELD

The following description relates to a wireless communication system and, more particularly, to a device and method for performing multiuser precoding in a wireless communication system.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure can provide a device and method for effectively selecting users for multiuser precoding in a wireless communication system.

The present disclosure can provide a device and method for more effectively performing end-to-end precoding using an artificial intelligence model in a wireless communication system.

The present disclosure can provide a device and method for more effectively performing end-to-end precoding using a scalable decoder using an artificial intelligence model in a wireless communication system.

The present disclosure can provide a device and method for selecting users for multiuser precoding using precoders in a wireless communication system.

The present disclosure can provide a device and method for supporting a user selection scheme suitable for a neural network model-based multiuser precoding architecture in a wireless communication system.

The present disclosure can provide a device and method for selecting users for multiuser precoding based on CSI (channel state information) feedback information generated by a neural network model in a wireless communication system.

The present disclosure can provide a device and method for selecting users without additional feedback information other than a feedback signal for precoder selection in neural network model-based multiuser precoding in a wireless communication system.

The present disclosure can provide a device and method for selecting users using precoding vectors determined based on a feedback signal of a neural network model-based multiuser precoding architecture in a wireless communication system.

The present disclosure can provide a device and method for iteratively excluding users using precoding vectors determined in a neural network model-based multiuser precoding architecture in a wireless communication system.

The present disclosure can provide a device and method for appropriately terminating iterative exclusion operations for users using precoding vectors determined in a neural network model-based multiuser precoding architecture in a wireless communication system.

Technical objects to be achieved in the present disclosure are not limited to what is mentioned above, and other technical objects not mentioned therein can be considered from the embodiments of the present disclosure to be described below by those skilled in the art to which a technical configuration of the present disclosure is applied.

As an embodiment of the present disclosure, a method of operating a device for performing multiuser precoding in a wireless communication system may comprise transmitting configuration information related to channel state information (CSI) feedback to candidate devices, transmitting reference signals corresponding to the configuration information, receiving CSI feedback signals from the candidate devices, determining precoding vectors for participating devices that are at least part of the candidate devices, performing precoding for data to the participating devices using the precoding vectors, and transmitting the precoded data. The participating devices may be determined based on information including magnitude values of precoding vectors for the candidate devices determined by a decoder neural network based on the CSI feedback signals generated by an encoder neural network.

As an embodiment of the present disclosure, a device for performing multiuser precoding in a wireless communication system may comprise a transceiver and a processor connected to the transceiver. The processor may transmit configuration information related to channel state information (CSI) feedback to candidate devices, transmit reference signals corresponding to the configuration information, receive CSI feedback signals from the candidate devices, determine precoding vectors for participating devices that are at least part of the candidate devices, perform precoding for data to the participating devices using the precoding vectors, and transmit the precoded data. The participating devices may be determined based on information including magnitude values of precoding vectors for the candidate devices determined by a decoder neural network based on the CSI feedback signals generated by an encoder neural network.

As an embodiment of the present disclosure, a communication device may comprise at least one processor and at least one computer memory connected to the at least one processor and configured to store instructions that direct operations as executed by the at least one processor. The operations may comprise transmitting configuration information related to channel state information (CSI) feedback to candidate devices, transmitting reference signals corresponding to the configuration information, receiving CSI feedback signals from the candidate devices, determining precoding vectors for participating devices that are at least part of the candidate devices, performing precoding for data to the participating devices using the precoding vectors, and transmitting the precoded data. The participating devices may be determined based on information including magnitude values of precoding vectors for the candidate devices determined by a decoder neural network based on the CSI feedback signals generated by an encoder neural network.

As an embodiment of the present disclosure, a non-transitory computer-readable medium storing at least one instructions may comprise the at least one instructions executable by a processor. The at least one instruction may control a device to transmit configuration information related to channel state information (CSI) feedback to candidate devices, transmit reference signals corresponding to the configuration information, receive CSI feedback signals from the candidate devices, determine precoding vectors for participating devices that are at least part of the candidate devices, perform precoding for data to the participating devices using the precoding vectors and transmit the precoded data. The participating devices may be determined based on information including magnitude values of precoding vectors for the candidate devices determined by a decoder neural network based on the CSI feedback signals generated by an encoder neural network.

The above-described aspects of the present disclosure are only some of the preferred embodiments of the present disclosure, and various embodiments reflecting the technical features of the present disclosure can be derived and understood based on the detailed description of the disclosure by those skilled in the art.

As is apparent from the above description, the embodiments of the present disclosure have the following effects.

According to the present disclosure, users for multiuser precoding can be selected effectively.

The effects that can be obtained from the embodiments of the present disclosure are not limited to the effects mentioned above, and other effects not mentioned can be clearly derived and understood from the description of the embodiments of the present disclosure below by those with ordinary knowledge in technical field to which the technical configuration of the present disclosure is applied. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
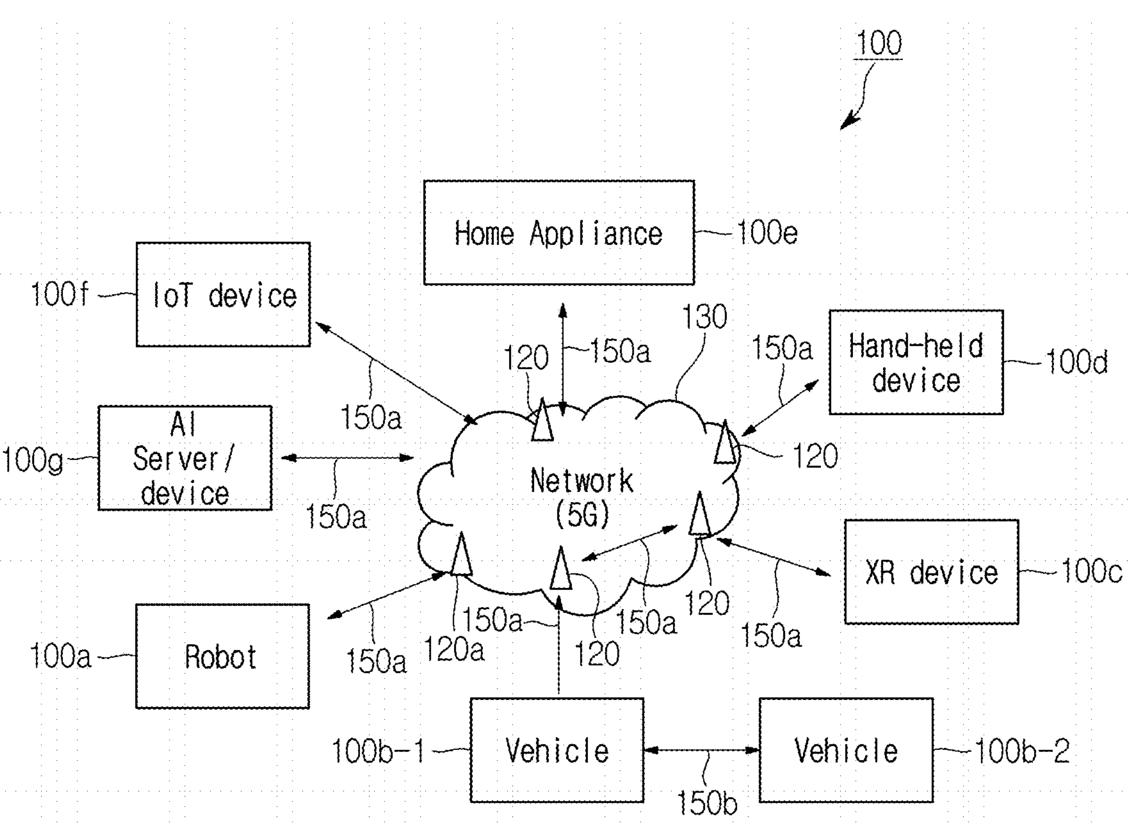
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot

100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least part of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
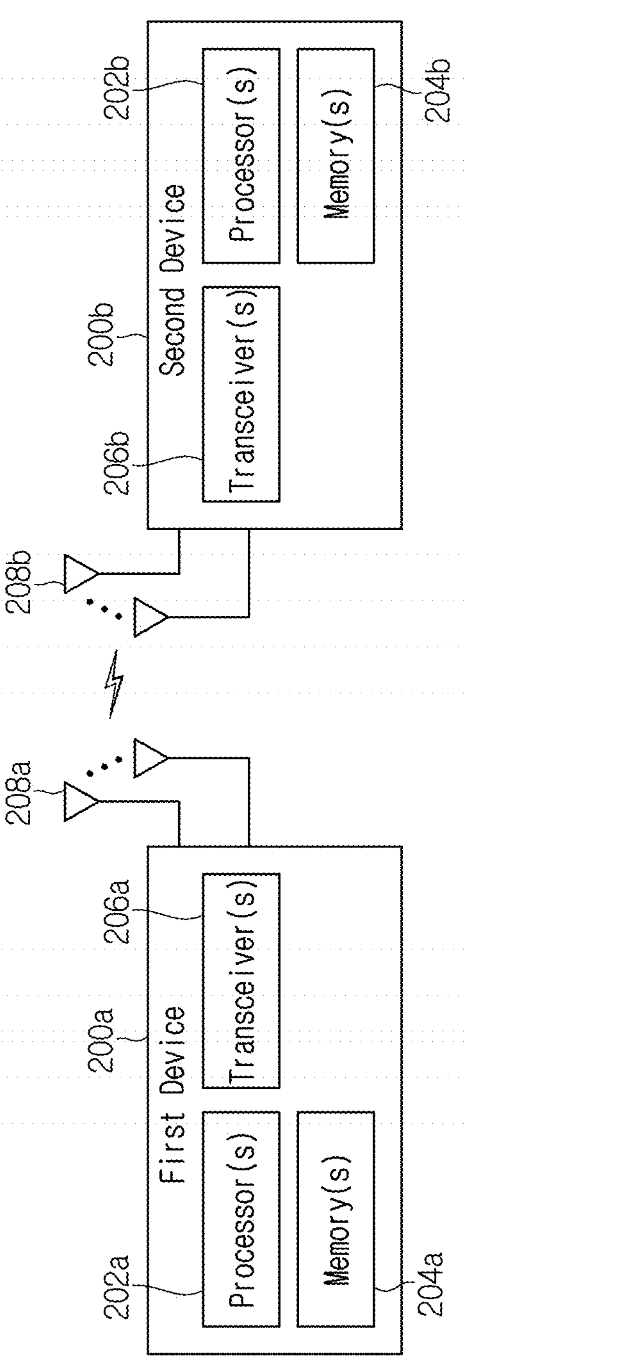
FIG. 2 illustrates an example of a wireless apparatus applicable to the present disclosure.

FIG. 2 illustrates an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figures 3, 4:
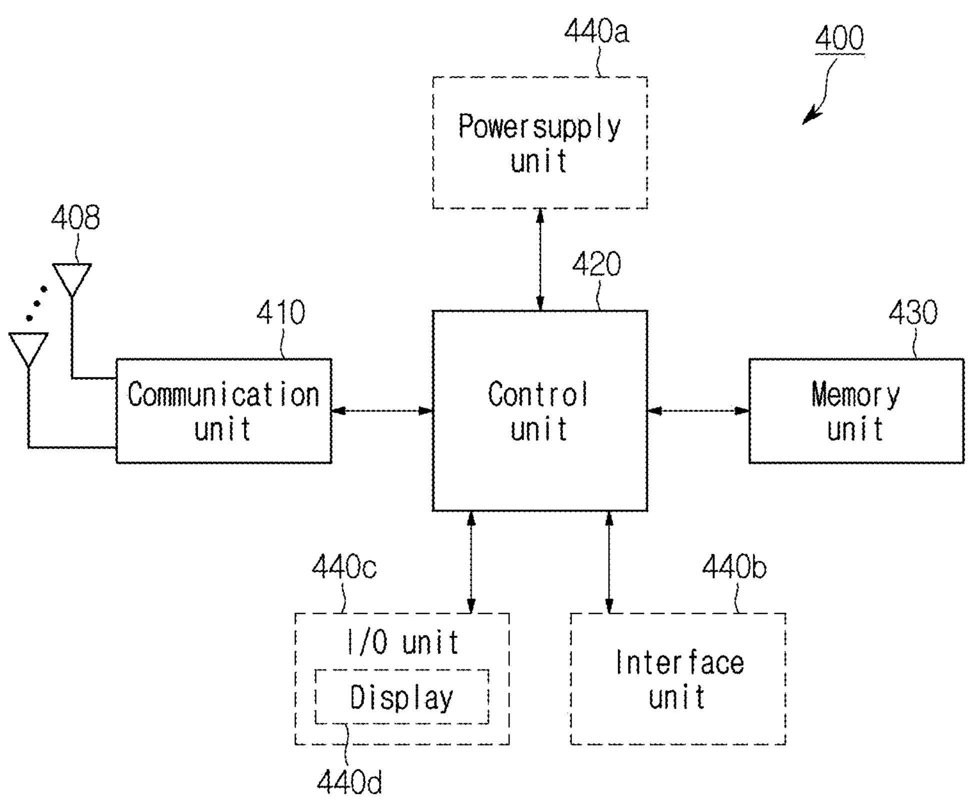
FIG. 3 illustrates another example of a wireless device applicable to the present disclosure.
FIG. 4 illustrates an example of a hand-held device applicable to the present disclosure.

FIG. 3 illustrates another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIGS. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

FIG. 4 illustrates an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
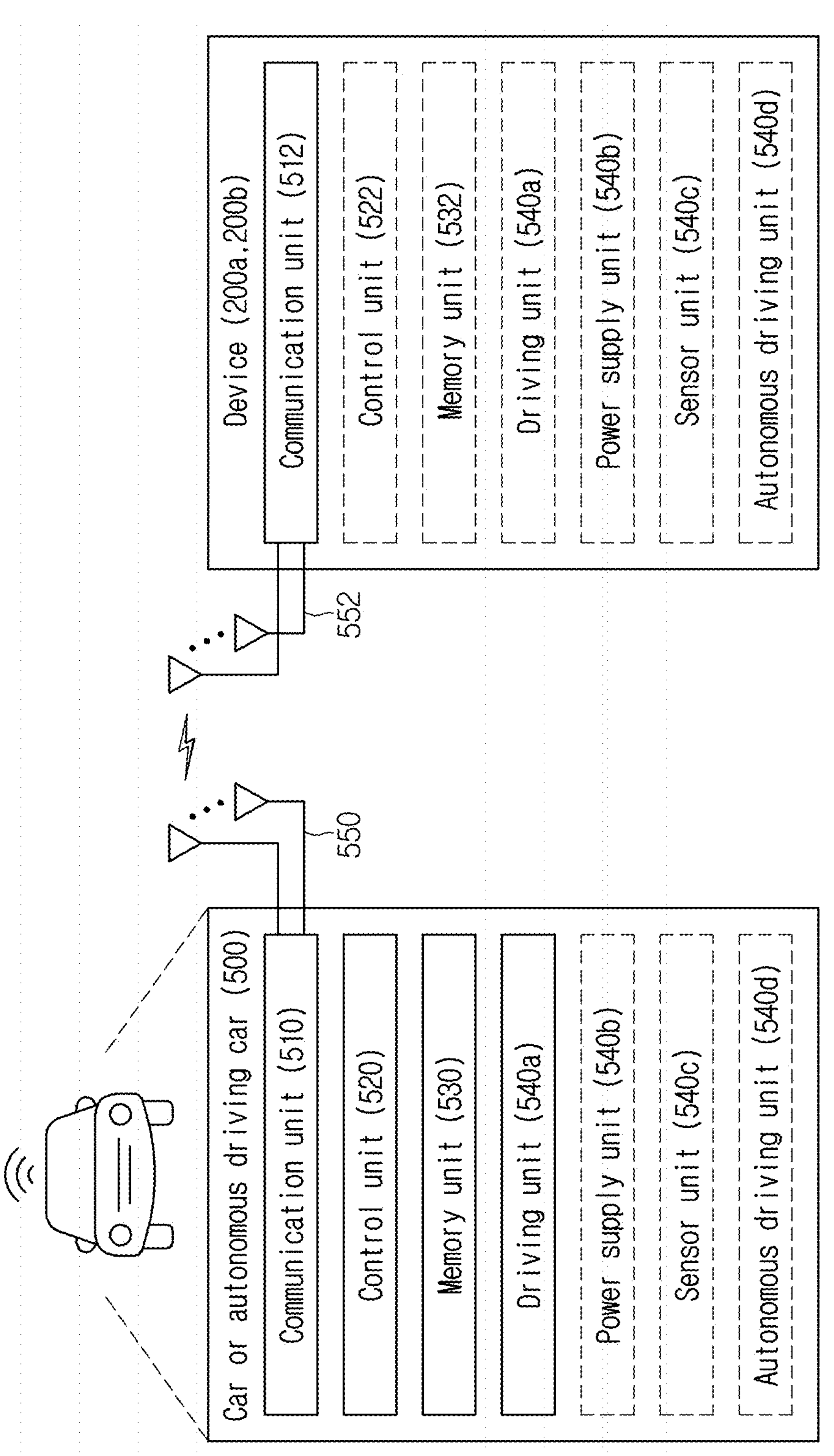
FIG. 5 illustrates an example of a car or an autonomous driving car applicable to the present disclosure.

FIG. 5 illustrates an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
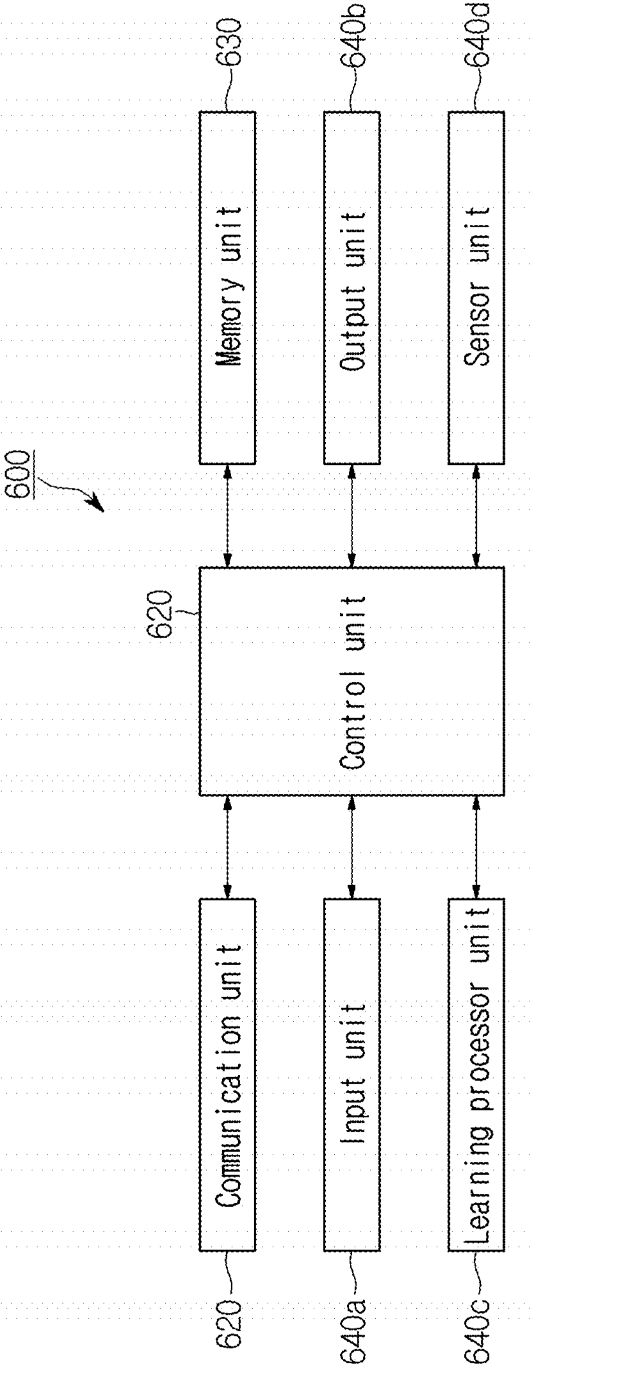
FIG. 6 illustrates an example of artificial intelligence (AI) device applicable to the present disclosure.

FIG. 6 illustrates an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640*a*/640*b*, a leaning processor unit (learning processor) 640*c* and a sensor unit 640*d*. The blocks 610 to 630/640*a* to 640*d* may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640*c* or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640*c* or transmit the history information to the AI server (FIG. 1, 140). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensing unit 640. In addition, the memory unit 630 may store control information and/or software code necessary to operate/execute the control unit 620.

The input unit 640*a* may acquire various types of data from the outside of the AI device 600. For example, the input unit 640*a* may acquire learning data for model learning, input data, to which the learning model will be applied, etc. The input unit 640*a* may include a camera, a microphone and/or a user input unit. The output unit 640*b* may generate video, audio or tactile output. The output unit 640*b* may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640*c* may train a model composed of an artificial neural network using training data. The learning processor unit 640*c* may perform AI processing along with the learning processor unit of the AI server (FIG. 1, 140). The learning processor unit 640*c* may process information received from an external device through the communication unit 610 and/or information stored in the memory unit 630. In addition, the output value of the learning processor unit 640*c* may be transmitted to the external device through the communication unit 610 and/or stored in the memory unit 630.

Figure 7:
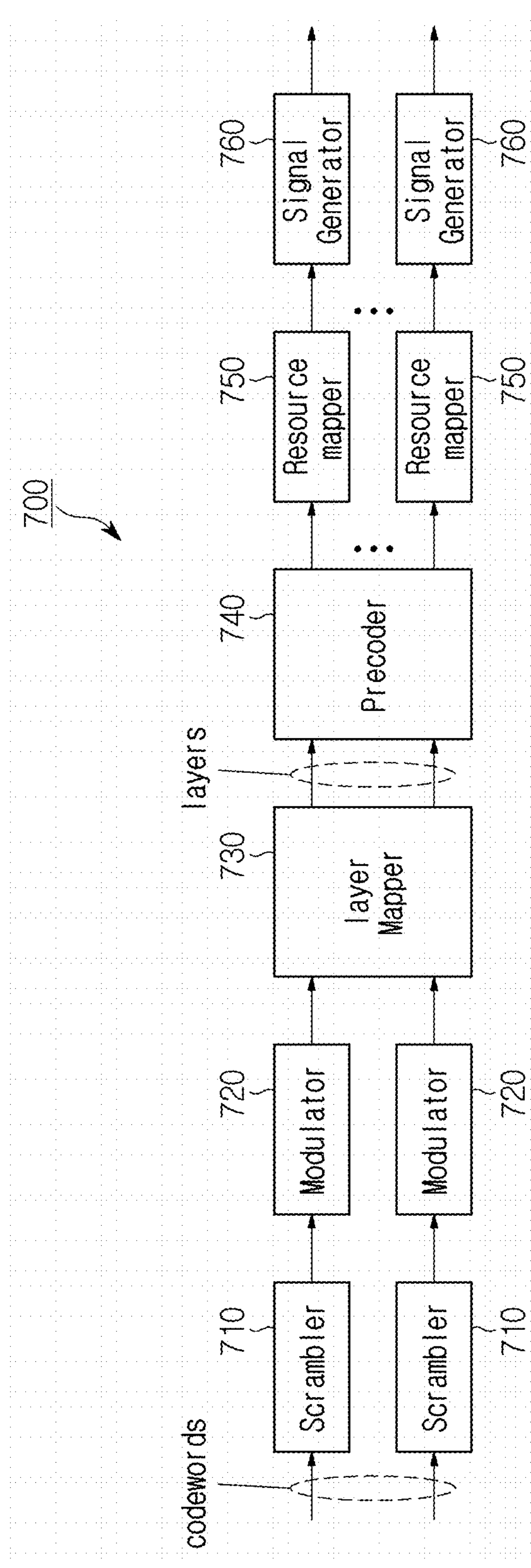
FIG. 7 illustrates a method of processing a transmitted signal applicable to the present disclosure.
Figure 8:
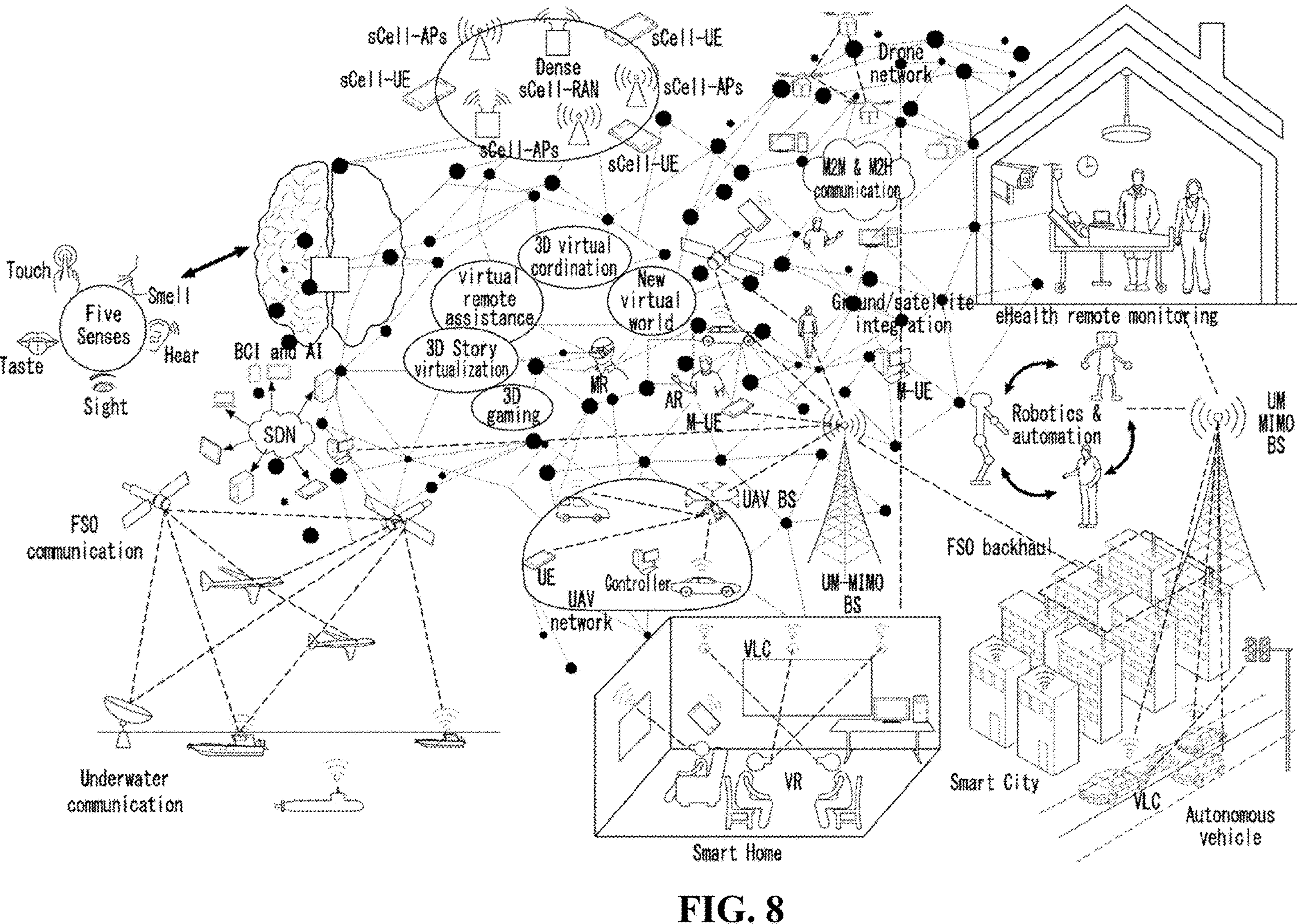
FIG. 8 illustrates an example of a communication structure providable in a 6th generation (6G) system applicable to the present disclosure.

FIG. 7 illustrates a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202*a* and 202*b* and/or the transceiver 206*a* and 206*b* of FIG. 2. In addition, for example, the hardware element of FIG. 7 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 710 to 750 may be implemented in the processors 202*a* and 202*b* of FIG. 2 and a block 760 may be implemented in the transceivers 206*a* and 206*b* of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH). Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output z of the precoder 740 may be obtained by multiplying the output y of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 10:
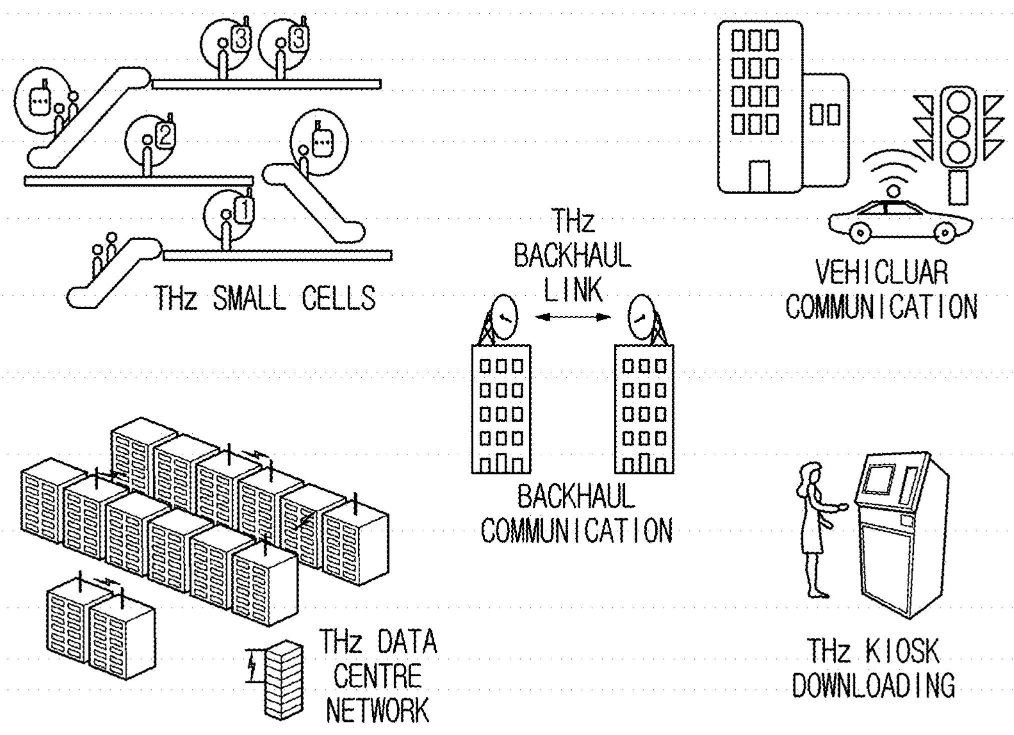
FIG. 10 illustrates a THz communication method applicable to the present disclosure.

FIG. 10 illustrates an example of a communication structure providable in a 6G system applicable to the present disclosure.

Referring to FIG. 10, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 9:
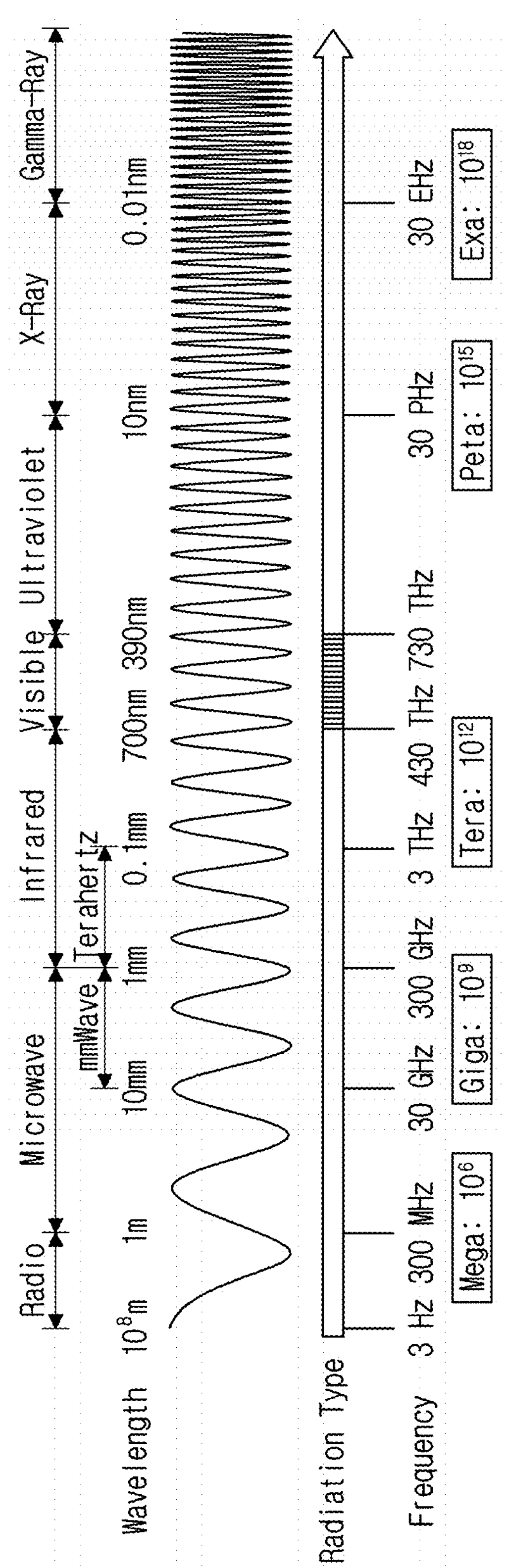
FIG. 9 illustrates an electromagnetic spectrum applicable to the present disclosure.

FIG. 9 illustrates an electromagnetic spectrum applicable to the present disclosure. For example, referring to FIG. 9, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mm Wave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHZ to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz Wireless Communication

FIG. 10 illustrates a THz communication method applicable to the present disclosure.

Referring to FIG. 10, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

Artificial Intelligence System

Figure 11:
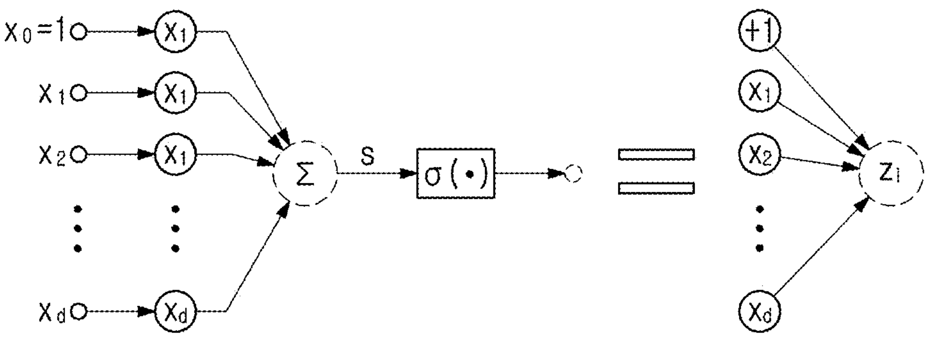
FIG. 11 illustrates a perceptron architecture in an artificial neural network applicable to the present disclosure.
Figure 12:
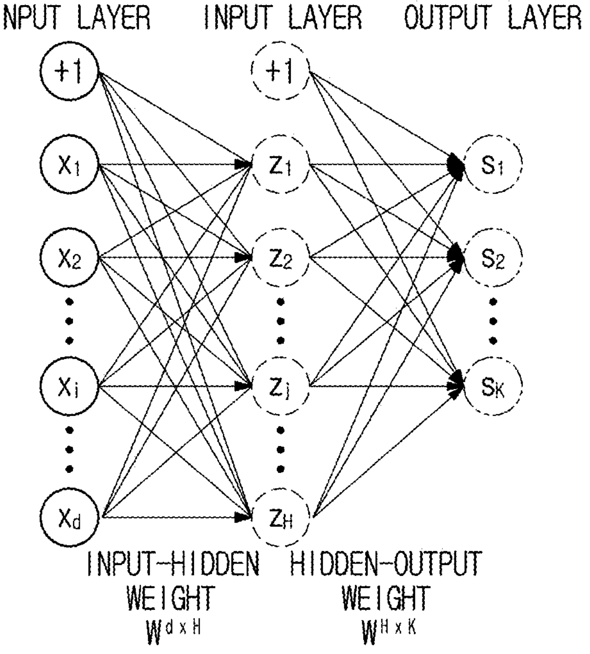
FIG. 12 illustrates an artificial neural network architecture applicable to the present disclosure.

FIG. 11 illustrates a perceptron architecture in an artificial neural network applicable to the present disclosure. In addition, FIG. 12 illustrates an artificial neural network architecture applicable to the present disclosure.

As described above, an artificial intelligence system may be applied to a 6G system. Herein, as an example, the artificial intelligence system may operate based on a learning model corresponding to the human brain, as described above. Herein, a paradigm of machine learning, which uses a neural network architecture with high complexity like artificial neural network, may be referred to as deep learning. In addition, neural network cores, which are used as a learning scheme, are mainly a deep neural network (DNN), a convolutional deep neural network (CNN), and a recurrent neural network (RNN). Herein, as an example referring to FIG. 23, an artificial neural network may consist of a plurality of perceptrons. Herein, when an input vector $x=\{x_1, x_2, \ldots, x_d\}$ is input, each component is multiplied by a weight $\{W_1, W_2, \ldots, W_d\}$, results are all added up, and then an activation function $\sigma(\ )$ is applied, of which the overall process may be referred to as a perceptron. For a large artificial neural network architecture, when expanding the simplified perceptron structure illustrated in FIG. 23, an input may be applied to different multidimensional perceptrons. For convenience of explanation, an input value or an output value will be referred to as a node.

Meanwhile, the perceptron structure illustrated in FIG. 11 may be described to consist of a total of 3 layers based on an input value and an output value. An artificial neural network, which has H (d+1)-dimensional perceptrons between a 1st layer and a 2nd layer and K (H+1)-dimensional perceptrons between the 2nd layer and a 3rd layer, may be expressed as in FIG. 12.

Herein, a layer, in which an input vector is located, is referred to as an input layer, a layer, in which a final output value is located, is referred to as an output layer, and all the layers between the input layer and the output layer are referred to as hidden layers. As an example, 3 layers are disclosed in FIG. 12, but since an input layer is excluding in counting the number of actual artificial neural network layers, it can be understood that the artificial neural network illustrated in FIG. 11 has a total of 2 layers. An artificial neural network is constructed by connecting perceptrons of a basic block two-dimensionally.

The above-described input layer, hidden layer and output layer are commonly applicable not only to multilayer perceptrons but also to various artificial neural network architectures like CNN and RNN, which will be described below. As there are more hidden layers, an artificial neural network becomes deeper, and a machine learning paradigm using a sufficiently deep artificial neural network as a learning model may be referred to as deep learning. In addition, an artificial neural network used for deep learning may be referred to as a deep neural network (DNN).

Figure 13:
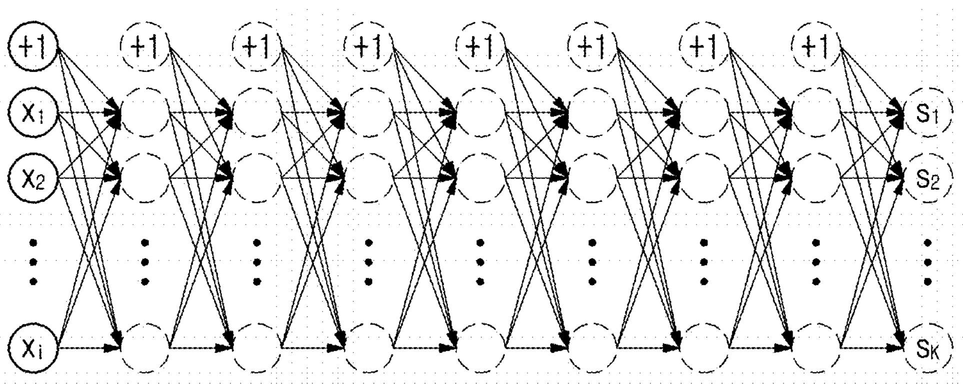
FIG. 13 illustrates a deep neural network applicable to the present disclosure.

FIG. 13 illustrates a deep neural network applicable to the present disclosure.

Referring to FIG. 13, a deep neural network may be a multilayer perceptron consisting of 8 layers (hidden layers+ output layer). Herein, the multilayer perceptron structure may be expressed as a fully-connected neural network. In a fully-connected neural network, there may be no connection between nodes in a same layer and only nodes located in neighboring layers may be connected with each other. A DNN has a fully-connected neural network structure combining a plurality of hidden layers and activation functions so that it may be effectively applied for identifying a correlation characteristic between an input and an output. Herein, the correlation characteristic may mean a joint probability between the input and the output.

Figure 14:
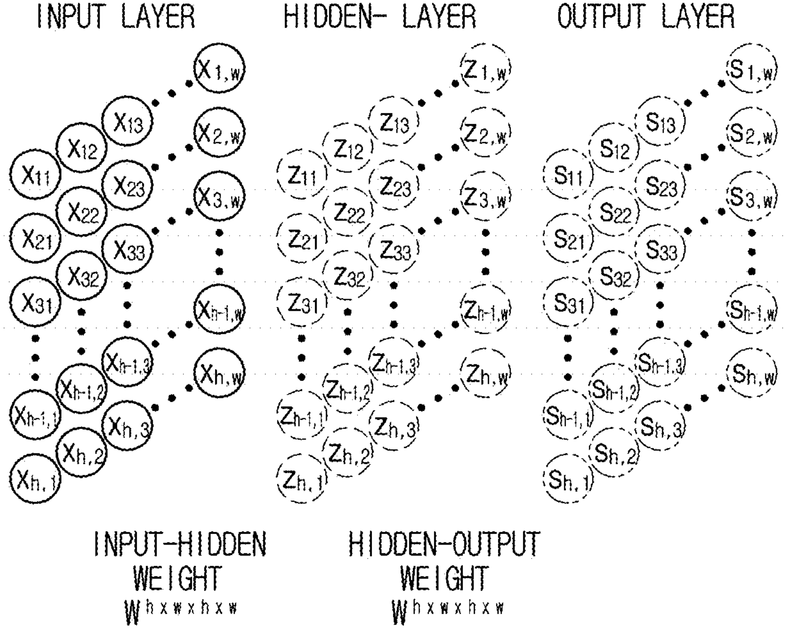
FIG. 14 illustrates a convolutional neural network applicable to the present disclosure.
Figure 15:
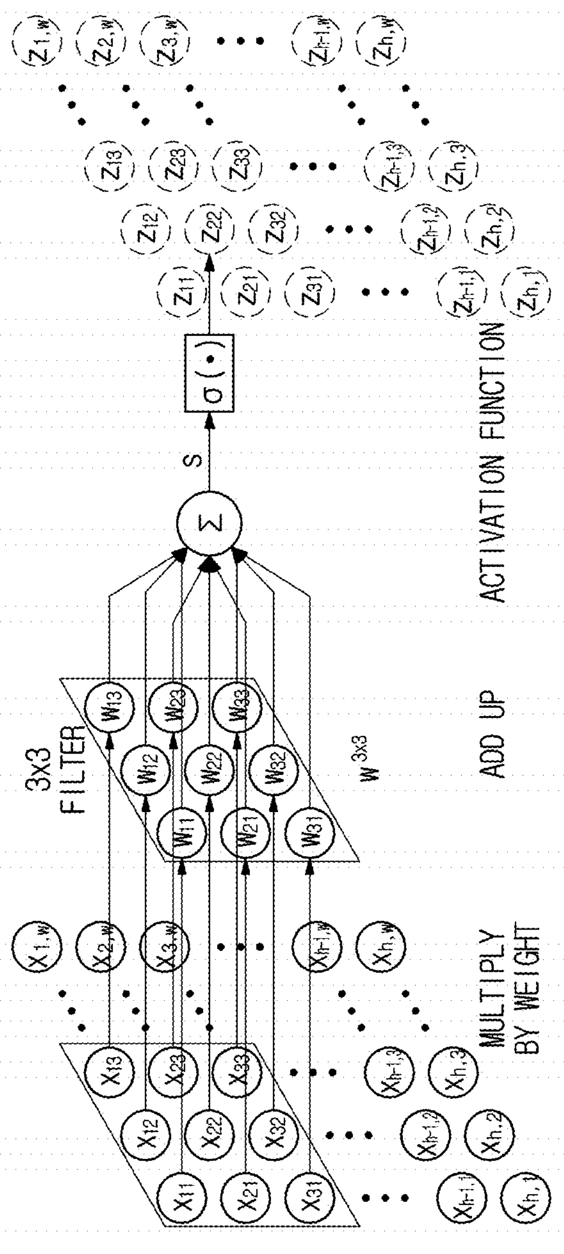
FIG. 15 illustrates a filter operation of a convolutional neural network applicable to the present disclosure.

FIG. 14 illustrates a convolutional neural network applicable to the present disclosure. In addition, FIG. 15 illustrates a filter operation of a convolutional neural network applicable to the present disclosure.

As an example, depending on how to connect a plurality of perceptrons, it is possible to form various artificial neural network structures different from the above-described DNN. Herein, in the DNN, nodes located in a single layer are arranged in a one-dimensional vertical direction. However, referring to FIG. 14, it is possible to assume a two-dimensional array of w horizontal nodes and h vertical nodes (the convolutional neural network structures of FIG. 14). In this case, since a weight is applied to each connection in a process of connecting one input node to a hidden layer, a total of h×w weights should be considered. As there are h×w nodes in an input layer, a total of $h^2w^2$ weights may be needed between two neighboring layers.

Furthermore, as the convolutional neural network of FIG. 14 has the problem of exponential increase in the number of weights according to the number of connections, the presence of a small filter may be assumed instead of considering every mode of connections between neighboring layers. As an example, as shown in FIG. 15, weighted summation and activation function operation may be enabled for a portion overlapped by a filter.

At this time, one filter has a weight corresponding to a number as large as its size, and learning of a weight may be performed to extract and output a specific feature on an image as a factor. In FIG. 15, a 3×3 filter may be applied to a top rightmost 3×3 area of an input layer, and an output value, which is a result of the weighted summation and activation function operation for a corresponding node, may be stored at $z_{22}$.

Herein, as the above-described filter scans the input layer while moving at a predetermined interval horizontally and vertically, a corresponding output value may be put a position of a current filter. Since a computation method is similar to a convolution computation for an image in the field of computer vision, such a structure of deep neural network may be referred to as a convolutional neural network (CNN), and a hidden layer created as a result of convolution computation may be referred to as a convolutional layer. In addition, a neural network with a plurality of convolutional layers may be referred to as a deep convolutional neural network (DCNN).

In addition, at a node in which a current filter is located in a convolutional layer, a weighted sum is calculated by including only a node in an area covered by the filter and thus the number of weights may be reduced. Accordingly, one filter may be so used as to focus on a feature of a local area. Thus, a CNN may be effectively applied to image data processing for which a physical distance in a two-dimensional area is a crucial criterion of determination. Meanwhile, a CNN may apply a plurality of filters immediately before a convolutional layer and create a plurality of output results through a convolution computation of each filter.

Meanwhile, depending on data properties, there may be data of which a sequence feature is important. A recurrent neural network structure may be a structure obtained by applying a scheme, in which elements in a data sequence are input one by one at each timestep by considering the distance variability and order of such sequence datasets and an output vector (hidden vector) output at a specific timestep is input with a very next element in the sequence, to an artificial neural network.

Figure 16:
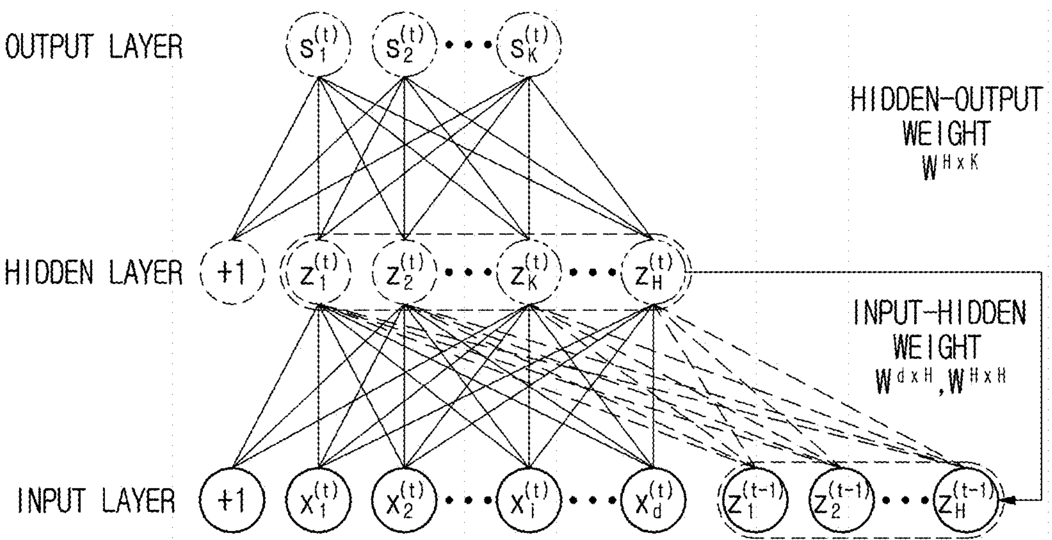
FIG. 16 illustrates a neural network architecture with a recurrent loop applicable to the present disclosure.
Figure 17:
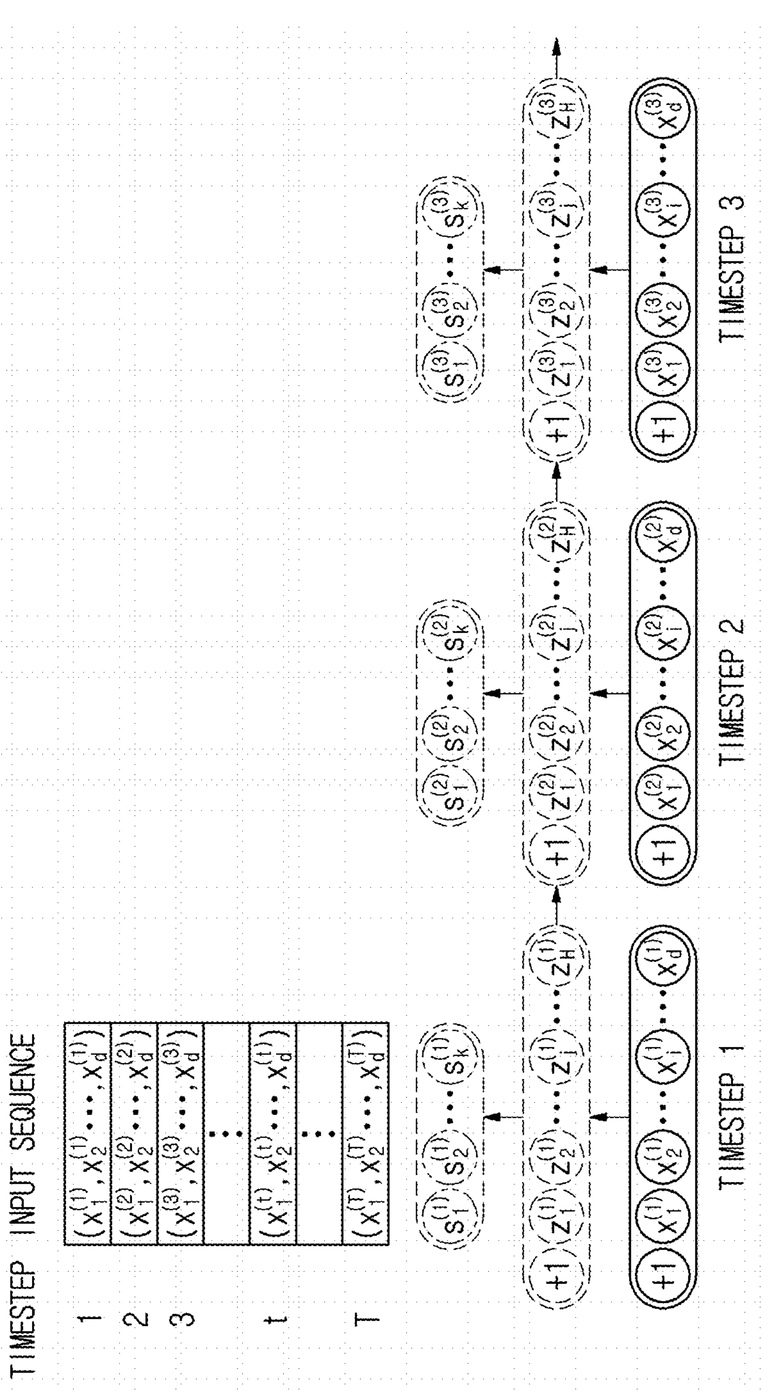
FIG. 17 illustrates an operational structure of a recurrent neural network applicable to the present disclosure.

FIG. 16 illustrates a neural network architecture with a recurrent loop applicable to the present disclosure. FIG. 17 illustrates an operational structure of a recurrent neural network applicable to the present disclosure.

Referring to FIG. 16, a recurrent neural network (RNN) may have a structure which applies a weighted sum and an activation function by inputting hidden vectors $\{z_1^{(t-1)}, z_2^{(t-1)}, \ldots, z_H^{(t-1)}\}$ of an immediately previous timestep t-1 during a process of inputting elements $\{x_1^{(t)}, x_2^{(t)} \ldots, x_d^{(t)}\}$ of a timestep t in a data sequence into a fully connected neural network. The reason why such hidden vectors are forwarded to a next timestep is because information in input vectors at previous timesteps is considered to have been accumulated in a hidden vector of a current timestep.

In addition, referring to FIG. 17, a recurrent neural network may operate in a predetermined timestep order for an input data sequence. Herein, as a hidden vector $\{z_1^{(1)}, z_2^{(1)}, \ldots, z_H^{(1)}\}$ at a time of inputting an input vector $\{x_{1(t)}, x_2^{(t)}, \ldots, x_d^{(t)}\}$ of timestep 1 into a recurrent neural network is input together with an input vector $\{x_1^{(2)}, x_2^{(2)}, \ldots, x_d^{(2)}\}$ of timestep 2, a vector $\{z_1^{(2)}, z_2^{(2)}, \ldots, z_H^{(2)}\}$ of a hidden layer is determined through a weighted sum and an activation function. Such a process is iteratively performed at timestep 2, timestep 3 and until timestep T.

Meanwhile, when a plurality of hidden layers are allocated in a recurrent neural network, this is referred to as a deep recurrent neural network (DRNN). A recurrent neural network is so designed as to effectively apply to sequence data (e.g., natural language processing).

Apart from DNN, CNN and RNN, other neural network cores used as a learning scheme include various deep learning techniques like restricted Boltzmann machine (RBM), deep belief networks (DBN) and deep Q-Network, and these may be applied to such areas as computer vision, voice recognition, natural language processing, and voice/signal processing.

Recently, there are attempts to integrate AI with a wireless communication system, but these are concentrated in an application layer and a network layer and, especially in the case of deep learning, in a wireless resource management and allocation filed. Nevertheless, such a study gradually evolves to an MAC layer and a physical layer, and there are attempts to combine deep learning and wireless transmission especially in a physical layer. As for a fundamental signal processing and communication mechanism, AI-based physical layer transmission means application of a signal processing and communication mechanism based on an AI driver, instead of a traditional communication framework. For example, it may include deep learning-based channel coding and decoding, deep learning-based signal estimation and detection, deep learning-based MIMO mechanism, and AI-based resource scheduling and allocation.

Specific Embodiment of the Present Invention

The present disclosure relates to multiuser precoding in a wireless communication system. Specifically, the present disclosure relates to a device and method for selecting users for multiuser precoding when performing artificial intelligence model-based multiuser precoding.

Wireless communication systems can provide various types of communication services such as voice and data. Recently, with the great development of artificial intelligence technology, attempts to integrate artificial intelligence technology to communication systems are rapidly increasing. The integration of artificial intelligence technology can be largely divided into C4AI (communications for AI), which develops communication technology to support artificial intelligence, and AI4C (AI for communications), which utilizes artificial intelligence technology to improve communication performance. In the case of AI4C, there is an attempt to increase design efficiency by replacing a channel encoder/decoder with an end-to-end auto-encoder. In the case of C4AI, only the weight or gradient of the model may be shared with a server without sharing raw data of the device using federated learning, one of the distributed learning scheme, thereby updating a common prediction model while protecting personal information.

The present disclosure considers a downlink precoding system assuming frequency-division duplex (FDD) and finite feedback rate, that is, rate-limited feedback. Additionally, the present disclosure considers a situation where the number of transmit antennas of a base station is M, and K single-antenna UEs and the base station communicate. Here, K<M. Accordingly, in the embodiments described below, it can be understood that an encoder is included in the UE and a decoder is included in the base station.

However, the above-mentioned assumption is for convenience of explanation, and the proposed technology may also be applied to other situations. For example, various embodiments described below may also be applied to uplink communication. In this case, in embodiments described later, a precoding matrix output from the decoder may be applied to uplink data. As another example, various embodiments described later may also be applied to sidelink communication. In this case, in embodiments described later, each of the encoder and decoder may be included in a UE, a vehicle, a road side unit (RSU), etc.

Figure 18:
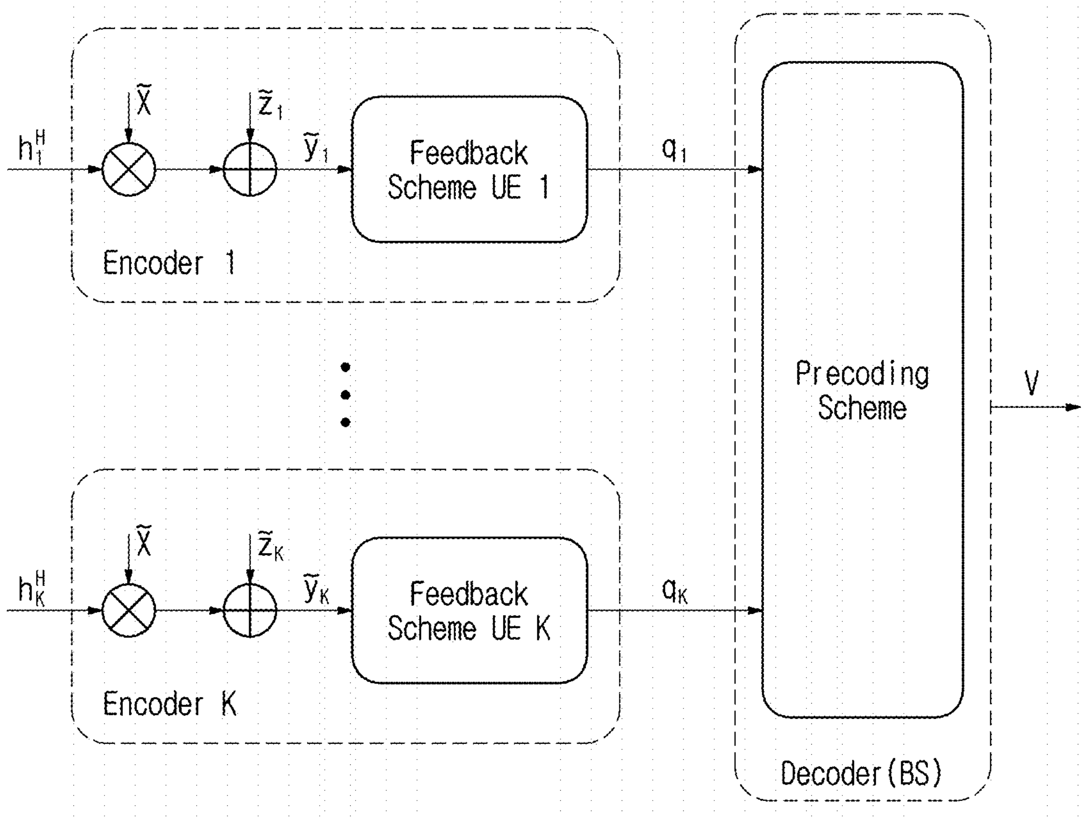
FIG. 18 shows an example of encoders and decoder for end-to-end multi-user precoding according to an embodiment of the present disclosure.

FIG. 18 shows an example of encoders and decoder for end-to-end multi-user precoding according to an embodiment of the present disclosure. Referring to FIG. 18, K encoders included in K UEs generate signals for feedback on channel information, and the decoder included in the base station generates a multiuser precoding matrix according to a precoding scheme.

If a signal transmitted from the base station is x, a symbol for a k-th UE is $s_k \in \mathbb{C}^M$, and a precoding vector for the k-th UE is $v_k \in \mathbb{C}^M$, then a precoding matrix $V \in \mathbb{C}^{M \times K}$ with $v_k$ as a k-th column may be defined, a vector s with a symbol $s_k$ for the k-th UE as a k-th element may be defined. At this time, it may be expressed as a transmission signal $$x = \Sigma_{k=1}^{K} v_k s_k = Vs.$$

In other words, it can be understood that linear precoding is performed at the base station. Additionally, precoding and symbols may be given constraints such as $\mathrm{Tr}(VV^H) \le P$ as a total power constraint and $\mathbb{E}[ss^H]=I$ as no correlation between symbols of different users, each symbol normalized.

If downlink channel gain between the base station and the k-th UE is $h_k \in \mathbb{C}^M$ and narrowband block-fading is assumed, a signal received at the k-th UE is equal to $$y_k = h_k^H v_k s_k + \Sigma_{j \ne k} h_k^H v_j s_j + z_k$$

and $z_k \sim \mathcal{CN}(0, \sigma 2)$ is AWGN (additive white Gaussian noise) in the k-th UE. Therefore, the achievable rate of the k-th UE may be calculated as [Equation 1] below.

$$R_k = \log_2\left(1 + \frac{|h_k^H v_k|^2}{\sum_{j \ne k} |h_k^H v_j|^2 + \sigma^2}\right) \quad \text{[Equation 1]}$$

In [Equation 1], $R_k$ denotes the achievable rate of the k-th UE, $h_k$ denotes the channel of the k-th UE, $v_k$ denotes the precoding vector for the k-th UE, and $\sigma^2$ denotes a noise vector.

In order to achieve the achievable rate, which is a theoretical value, in actual communication situations, additional schemes may be appropriately used along with the technology proposed in the present disclosure. Additionally, various quality of service (QOS) in addition to the achievable rate may be considered as an indicator of communication performance.

In order to maximize a sum rate $R=\Sigma_k R_k$ or optimize other communication QoS, the encoders and decoder illustrated in FIG. 18 may be appropriately designed, and for optimization, the encoders and decoder may be composed of a neural network (NN).

In a downlink training phase preceding a data transmission phase, the base station transmits downlink training pilots $\tilde{X} \in \mathbb{C}^{M \times L}$ with a pilot length of L. The i-th column of $\tilde{X}$, that is, the i-th pilot transmission $\tilde{x}_l$, satisfies a per-transmission power constraint $$\|\tilde{x}_l\|_2^2 \le P.$$

At this time, the signal $\tilde{y}_k \in \mathbb{C}^{1 \times L}$ with the length L, which is received and observed at the k-th UE, may be expressed as [Equation 2] below.

$$\tilde{y}_k = h_k^H \tilde{X} + \tilde{z}_k \quad \text{[Equation 2]}$$

In [Equation 2], $\tilde{y}_k$ denotes a signal received at the k-th UE, $h_k$ denotes the channel of the k-th UE, $\tilde{X}$ denotes downlink training pilots, and $\tilde{z}_k \sim \mathcal{CN}(0, \sigma^2 I)$ denotes AWGN at the k-th UE.

In FIG. 18, the encoder of the k-th UE takes $\tilde{y}_k \in \mathbb{C}^{1\times L}$ as input and provides B information bits as output. This rule or function is a feedback scheme $\mathcal{F}_k: \mathbb{C}^{1\times L} \rightarrow \{\pm 1\}^B$ adopted by the k-th UE. That is, the feedback bits of the k-th UE may be expressed as $q_k = \mathcal{F}_k(\tilde{y}_k)$. Meanwhile, the decoder in FIG. 18 takes the feedback bits collected from all K UEs as input and generates a precoding matrix $V \in \mathbb{C}^{M\times K}$ as output. This function is a downlink precoding scheme $\mathcal{P}: \{\pm 1\}^{KB} \rightarrow \mathbb{C}^{M\times K}$ at the base station.

Therefore, the purpose of end-to-end multiuser precoding as shown in FIG. 18 may be summarized as a sum rate maximization problem as shown in [Equation 3] below. Here, as an objective function, various communication QoS other than sum rate may be used.

$$\underset{\tilde{X},\{\mathcal{F}_k(\cdot)\}_{\forall k},\mathcal{P}(\cdot)}{\text{maximize}} \sum_{k=1}^{K} \log_2\left(1 + \frac{|h_k^H v_k|^2}{\sum_{j\neq k} |h_k^H v_j|^2 + \sigma^2}\right) \quad \text{[Equation 3]}$$

$$\text{subject to}$$

$$V = \mathcal{P}([q_1^T, \ldots, q_K^T]^T),$$

$$q_k = \mathcal{F}_k(h_k^H \tilde{X} + \tilde{z}_k),\ \forall k,$$

$$Tr(VV^H) \leq P,$$

$$\|\tilde{x}_\ell\|_2^2 \leq P,\ \forall \ell$$

In [Equation 3], $\tilde{X}$ denotes downlink training pilots, $\{\mathcal{F}_k(\cdot)\}_{\forall k}$ denotes the feedback scheme at the UE, $\mathcal{P}(\cdot)$ denotes the precoding technique at the base station, $h_k$ denotes the channel of the k-th UE, $h_k$ denotes the precoding vector for the k-th UE, V denotes a precoding matrix, $q_k$ denotes the CSI feedback signal of the k-th UE, and P denotes a power sum.

As expressed in [Equation 3], the problem of designing end-to-end multiuser precoding can be understood as finding a combination that maximizes the sum rate or optimizes other QoS for the following three items.

√$\tilde{X}$: downlink training pilots

√$\{\mathcal{F}_k(\cdot)\}_{\forall k}$: feedback schemes at the UE

√$\mathcal{P}(\cdot)$: precoding scheme at the base station

In addition to the feedback scheme used by each UE and the precoding scheme adopted by the base station, training pilots $\tilde{X}$ transmitted from the base station are also variables for optimization.

As a means of determining an optimized end-to-end FDD downlink precoding architecture, deep learning may be used. That is, optimal neural network parameters may be determined by configuring all of the downlink training pilots, feedback schemes and precoding scheme into at least one neural network and training the configured at least one neural network. An example of a neural network architecture for end-to-end multiuser downlink precoding is shown in FIG. 19 below.

Figure 19:
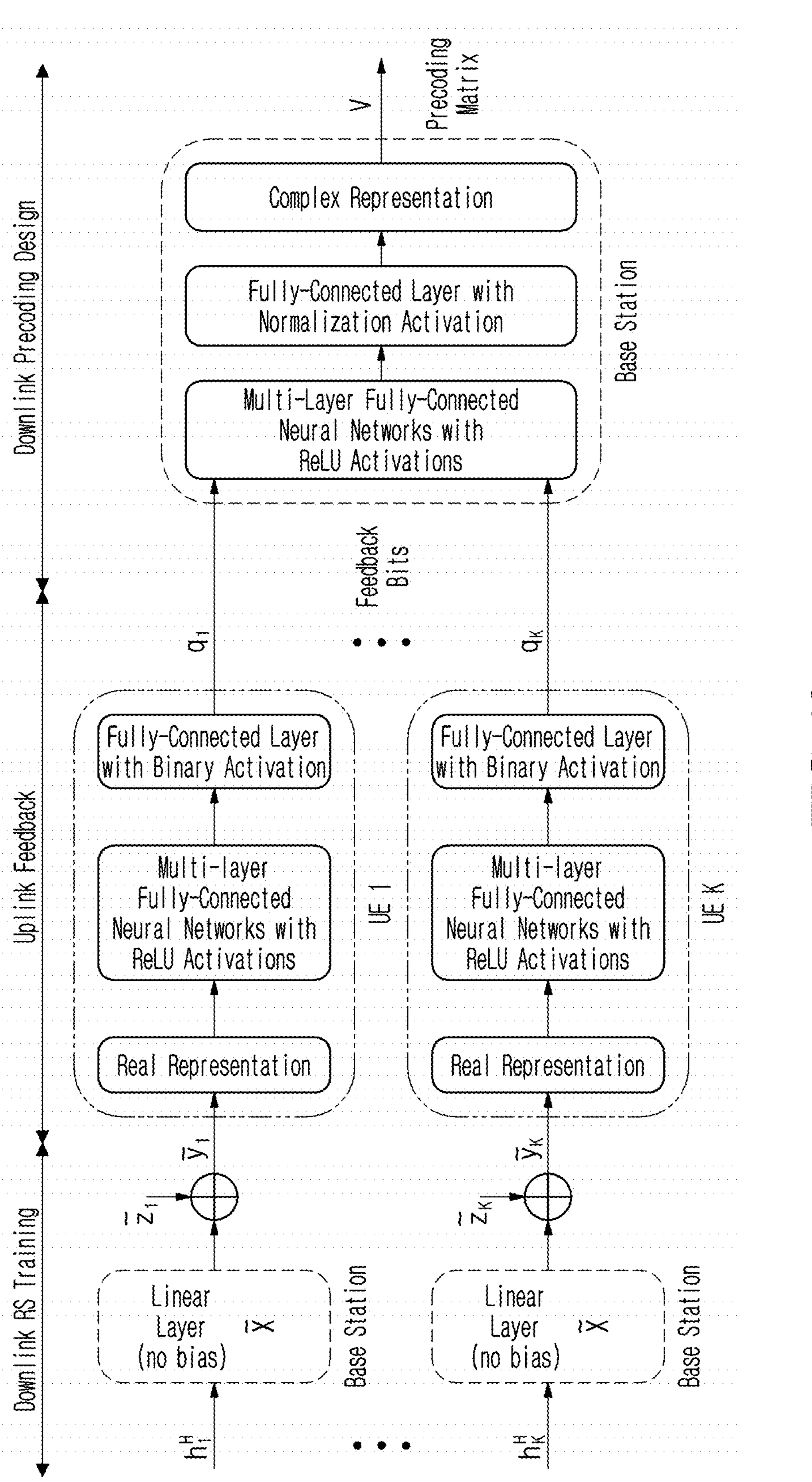
FIG. 19 shows an example of a neural network (NN) architecture for end-to-end multiuser precoding according to an embodiment of the present disclosure.
Figure 20:
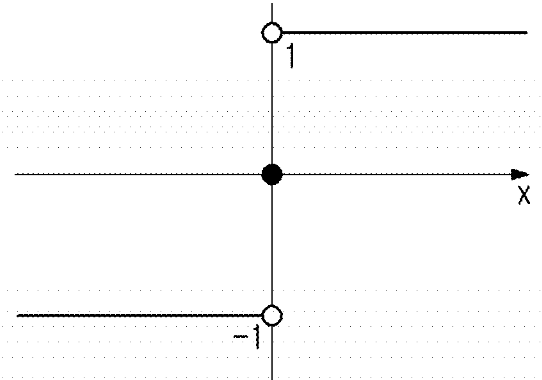
FIG. 20 shows an example of a signum function that may be used as an activation function according to an embodiment of the present disclosure.

FIG. 19 shows an example of a neural network architecture for end-to-end multiuser precoding according to an embodiment of the present disclosure. Referring to FIG. 19, a base station may include a linear layer for downlink reference signal training. UEs may include a real representation layer, multi-layer fully-connected neural networks with ReLU activations, and a fully-connected layer with binary activation, for uplink feedback. Additionally, the base station may include multi-layer fully-connected neural networks with ReLU activations, a fully-connected layer with normalization activation, and a complex representation layer, for downlink precoding. In FIG. 19, binary activation may be used, such that the last layer of the neural network constituting the encoder of the UE generates binary output, that is, each component of $q_k \in \{\pm 1\}^B$ has a bipolar feedback bit. That is, a signum function shown in FIG. 20 may be used as an activation function of the last layer of the encoder neural network.

If the channel distribution for different users is independent and identically distributed (i.i.d), the same neural network may be used as the encoder of each user regardless of the number K of users. That is, different users use common neural network weights and biases, and the neural network parameters used in all user-side encoders may be the same regardless of the number K of users. At this time, regardless of the number K of users, the same encoder neural network used by different users may be a user-side encoder neural network obtained through training in a single-user scenario. That is, for any K, the same architecture and parameter set (e.g., weights, biases, etc.) as the encoder neural network used in the single-user situation may be applied as the encoder neural network even in the K-user scenario.

Figure 21:
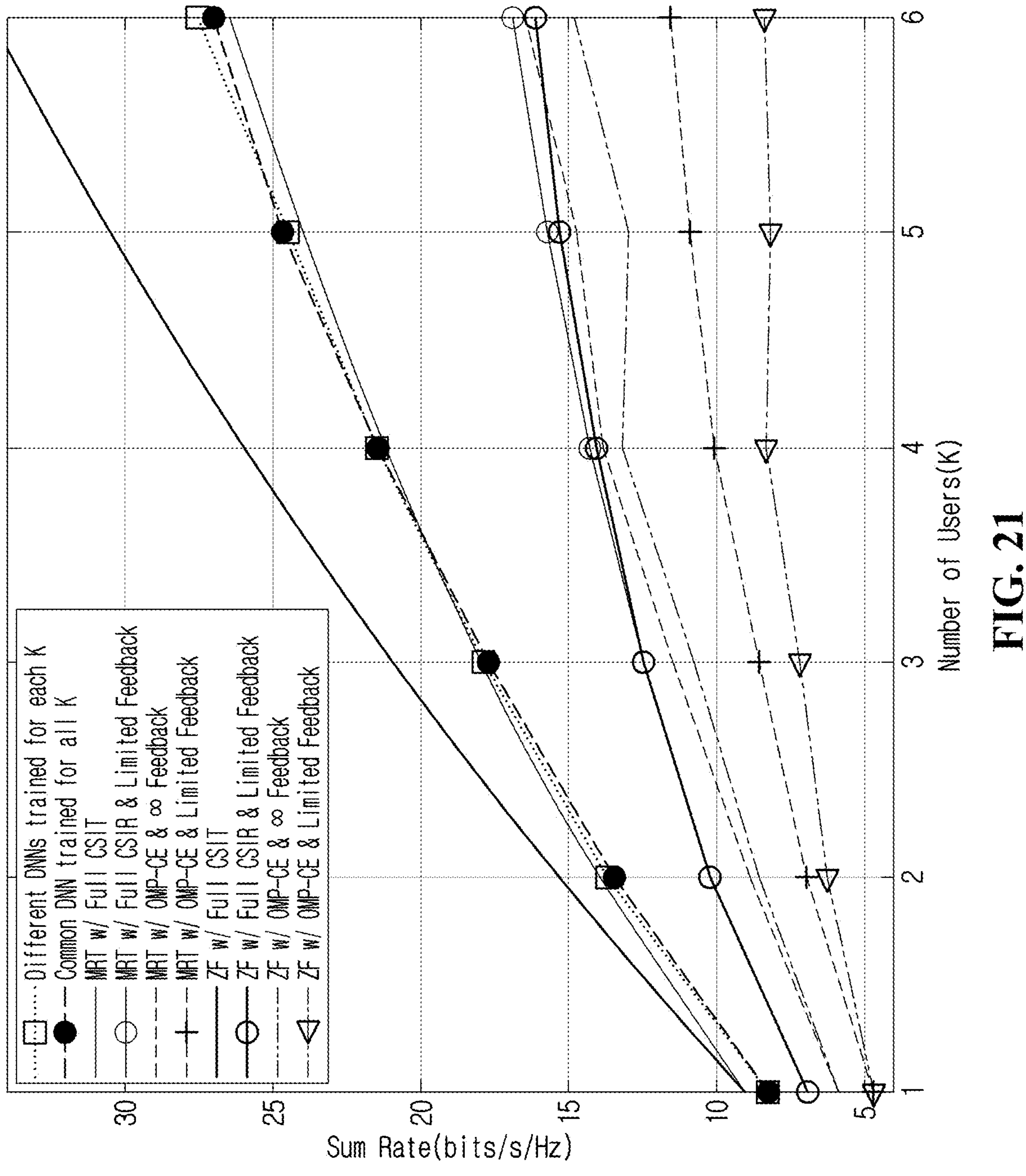
FIG. 21 shows a comparison example of precoding performance according to the number of users.

FIG. 21 shows a comparison example of precoding performance according to the number of users. FIG. 21 shows a sum rate as precoding performance according to the number K of users. In FIG. 21, it can be seen that, when comparing 'Different DNNs trained for each K', which uses different encoder neural networks obtained by new training each time the number K of users changes, and 'Common DNN trained for all K', where all users use the same encoder neural network regardless of the aforementioned K, there is almost no difference in performance between the two schemes.

However, in the case of a base station-side decoder neural network, assuming that the length of the feedback bits $q_k$ for any user k does not change whenever the number K of users changes, since the input size and output size of the decoder neural network vary in proportion to K, there is still a problem that the architecture of the decoder neural network changes. If the number of users changes, not only is a new decoder neural network parameter set (e.g., weight, bias, etc.) required, but the architecture of the decoder neural network also changes, causing the problem that the decoder is not scalable at all to the number K of users. In other words, in order to not fix the number of users supported by the system, different neural networks may be needed as many cases as the number of users to be supported.

Accordingly, a multiuser precoding architecture with scalability may be considered. For example, in designing the architecture of a decoder neural network, it can be expected to improve precoding performance by appropriately considering the domain knowledge of a human expert. The performance of the scheme using a decoder having a architecture considering the domain knowledge of the human expert is shown in FIG. 22 below.

Figure 22:
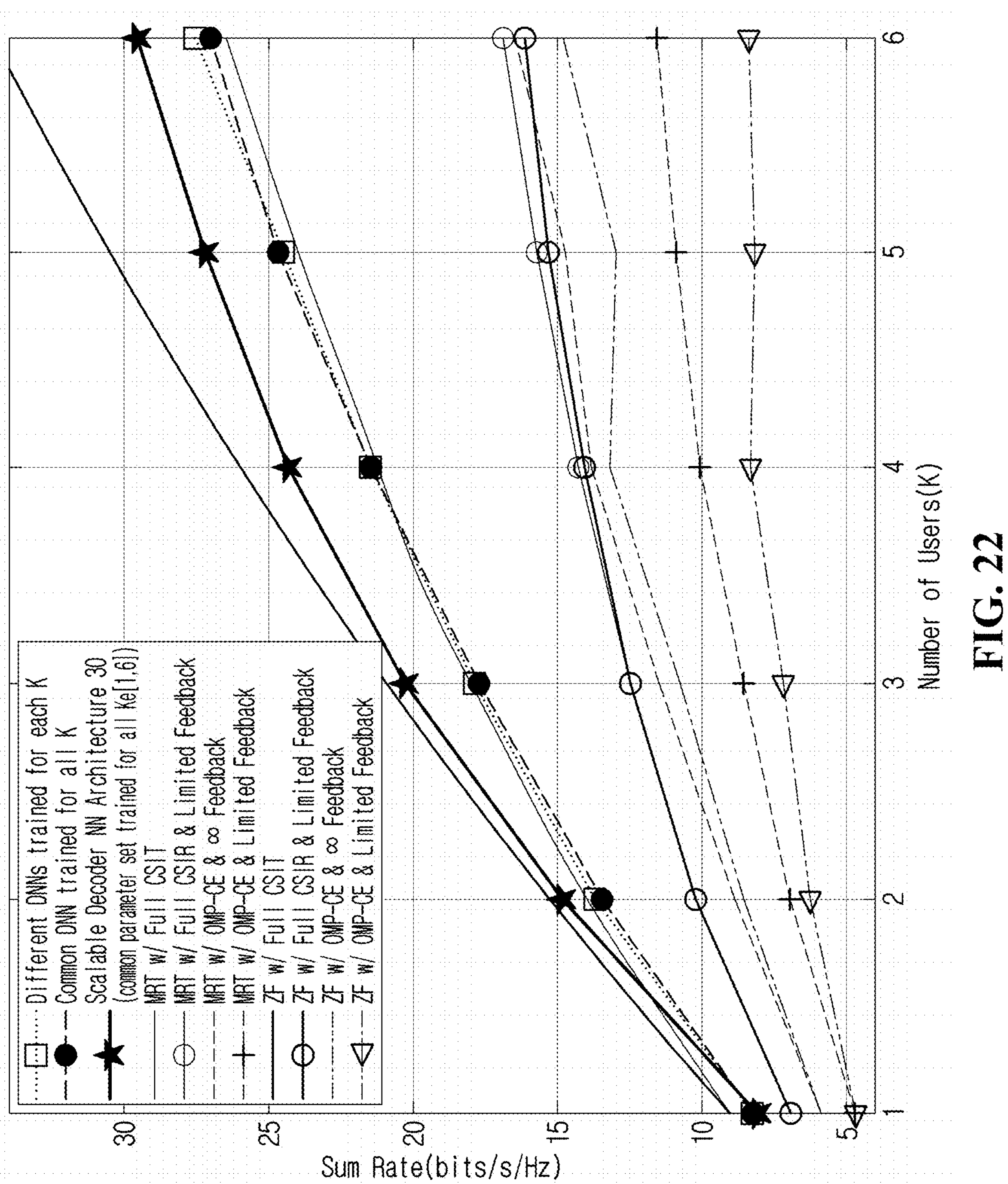
FIG. 22 shows a comparison example of sum rates achieved by a scalable decoder neural network architecture.

FIG. 22 shows a comparison example of sum rates achieved by a scalable decoder neural network architecture. FIG. 22 shows a sum rate as precoding performance according to the number K of users. It is confirmed that even if the total number of users changes, the same neural network, that is, a neural network that has been trained for all supported users, may still be used, and even though a single neural network is used, a architecture that uses a scalable decoder neural network has performance gain of up to 14% or more compared to existing schemes.

On the other hand, the channel feedback scheme that does not apply deep learning is generally designed to independently optimize operations including channel estimation, compression, feedback, and precoding. Therefore, the channel feedback scheme will have poor performance compared to an end-to-end precoding architecture that is jointly optimized for operations. In particular, in situations where a small number of downlink pilot or reference signals are used and the feedback rate is low, the performance degradation of the channel feedback scheme without deep learning may be greater. Accordingly, the above-described scalable decoder architecture may be applied.

The CSI decoder according to the above-described scalable decoder architecture is a neural network that takes as input a CSI feedback signal $q_k$ received from the user-side encoder neural network of the end-to-end precoding architecture and outputs the precoding vector $v_k$ for the UE and may be included in the base station. The role of the base station-side decoder neural network in the end-to-end precoding system is to receive CSI feedback signals $q_1, \ldots, q_k$ for all UEs as input from the user-side encoder neural network, and output a precoding vector $V=[v_1, \ldots, v_k]$ corresponding thereto.

Specifically, when the scalable decoder architecture is applied, the decoder included in the base station includes per-UE decoders. The per-UE decoder neural network generates only the precoder vector for the UE as output and takes a signal dedicated to the UE as input. A total of two signals per decoder for each UE are provided as input to the decoder, and one of the two input signals is feedback bits for the UE (hereinafter referred to as 'first input signal') and the other input signal (Hereinafter referred to as second input signal) is as follows.

Before explaining the second input signal, in order to properly consider domain knowledge in decoder architecture design, the purpose of the end-to-end multiuser precoding system and decoder is explained again as follows. [Equation 3] expresses a maximization problem with the sum rate among various QoS, which may be used as an indicator of precoding performance, as an objective function. In the objective function of [Equation 3], when referencing the fraction term excluding 1 in the logarithm, it is confirmed that a direction that maximizes the numerator of the fraction term while simultaneously minimizing the denominator is a direction that maximizes the sum rate.

Since the sum rate is defined as the sum of the achievable rates for all UEs, considering the achievable rate for any k-th UE, the achievable rate $R_k$ of the k-th UE may be calculated as [Equation 1]. By maximizing the signal-to-interference-plus-noise ratio (SINR), $R_k$ may be maximized. In [Equation 1], the purpose of the decoder neural network is to determine a precoding vector $v_k(\in 1, 2, \ldots,)$ that may maximize the numerator $$|h_k^H v_k|^2,$$

and minimize $$\Sigma_{j\neq k}|h_k^H v_j|^2$$

the denominator.

For convenience of explanation, without loss of generality, information on $h_k$ is required for the k-th decoder neural network for the k-th UE to generate $v_k$ that maximizes the numerator $$|h_k^H v_k|^2$$

of the SINR. Therefore, $q_k$ corresponding to $h_k$ may be provided as an input to the decoder neural network. Meanwhile, an interference term $$\Sigma_{j\neq k'}|h_{k'}^H v_j|^2$$

for the k-th UE may be considered to minimize the denominator of the SINR at the k'-th UE, which is different from the k-th UE. At this time, information on $h_{k'}(k'\in\{1, 2, \ldots, K\}/\{k\})$ other than the channel $h_k$ for the k-th UE is required for the output $v_k$ of the k-th decoder neural network to minimize the contribution to the interference term for the k'-th UE. At this time, $q_{k'}(k'\in\{1, 2, \ldots, K\}/\{k\})$ corresponding to $h_{k'}(k'\in\{1, 2, \ldots, K\}/\{k\})$ may be considered, and a result $\Sigma_{j\neq k}q_j$ of adding up all $q_k'(k'\in\{1, 2, \ldots, K\}/\{k\})$ is provided as the input to the decoder neural network. In the calculation of $\in_{j\neq k}q_j$, the addition operation may be an arithmetic operation rather than a bitwise operation. For example, when adding 11 and 10, applying the XOR bitwise operation to 11 and 10 would result in 01, but applying the arithmetic operation to 11 and 10 would result in 21. In other words, in various embodiments of the present disclosure, even if the CSI feedback signal is given as a bit stream, the addition operation for calculating Σj≠kqj may not be performed bitwise. At this time, before being input as input to the decoder neural network, $\Sigma_{j\neq k}q_j$ may be multiplied by an appropriate scaling factor (e.g., $$\frac{1}{K-1}).$$

In order to reduce interference at the k'-th UE (k'≠k), the k-th decoder neural network generates $v_k$ by considering the input $\Sigma_{j\neq k}q_j$.

In summary, in various embodiments of the present disclosure, as an input signal of the k-th decoder neural network, $\Sigma_{j\neq k}q_j$ (hereinafter referred to as 'second input signal) which is the sum of feedback bits for all UEs other than the k-th UE may be provided along with the feedback bits $q_k$ (hereinafter referred to as 'first input signal') of the k-th UE.

If feedback bits for all UEs not excluding the k-th UE are used as the second input signal of the decoder neural network for the k-th UE, the second input signal will be the same for all UEs. If some data is the same for all UEs, from an information theory perspective, this means that the role of the data as information is reduced. In general, the learning and inference ability of a neural network decreases as the neural network architecture becomes simpler, and higher neural network learning and inference ability requires a more complex neural network architecture. Therefore, if other conditions are the same, using the feedback bits for all UEs not excluding the k-th UE as the second input signal of the decoder neural network means a more complex neural network architecture with greater ability compared to using the feedback bits for the UEs except the k-th UE as the second input signal of the decoder neural network. That is, according to various embodiments of the present disclosure, using feedback bits for UEs other than the k-th UE as the second input signal to the decoder neural network has the advantage of facilitating learning of the neural network.

Meanwhile, in various embodiments of the present disclosure, K parallel decoder neural networks share the same architecture and parameter set (e.g., weights, biases, etc.). In other words, decoders for different UEs may use the same neural network. Therefore, it can be understood that if there is only one decoder neural network, and the input signals for each UE are sequentially input to the only decoder neural network, the precoding vector for the UE is sequentially output as output. When training the parameter set of the decoder neural network, exactly this perspective may be valid. Since the decoder network for each UE is the same, the K decoder neural networks are trained while sharing a common set of parameters. That is, the shared common parameters are learned.

The characteristics of the decoder neural network architecture described above can be broadly expressed in three ways as follows.

First, there are a plurality of parallel decoder neural networks as many as the number of UEs, and each decoder neural network outputs a precoding vector for the UE. A decoder neural network is configured for each UE, and the decoder neural network for each UE generates only the precoding vector $v_k$ for the k-th UE as output. Therefore, it can be understood that a total of K decoder neural networks exist in parallel.

Second, the sum signal of feedback bits, which is a signal processed with appropriate consideration of expert knowledge, is input as input to each decoder neural network. Considering each decoder neural network, $\Sigma_{j\neq k}q_j$, which is the sum of feedback bits for all other UEs except the k-th UE, along with the feedback bits $q_k$ of the k-th input, is used as the input signal of the k-th decoder neural network. Here, the sum is an arithmetic operation, not a bitwise operation. The sum signal of the feedback bits may be multiplied by an appropriate scaling factor (e.g., $$\frac{1}{K-1})$$

before being input as the input to the decoder neural network. For example, $$\frac{1}{K-1}\sum_{j\neq k} q_j$$

may be used as the input signal of the k-th decoder neural network.

Third, the architecture and parameter set of the decoder neural network for all UEs are the same. The K parallel decoder neural networks described above not only have the same architecture but also use the same parameter set (e.g., weights and biases). That is, K decoders for different UEs use the same neural network. Therefore, in various embodiments, there is only one decoder neural network, and when input signals for each UE are sequentially input to the only decoder neural network, the only decoder neural network may sequentially output precoding vectors for the UE as output. Accordingly, in the training process, shared common parameters between decoder neural networks for each UE may be learned.

Figure 23:
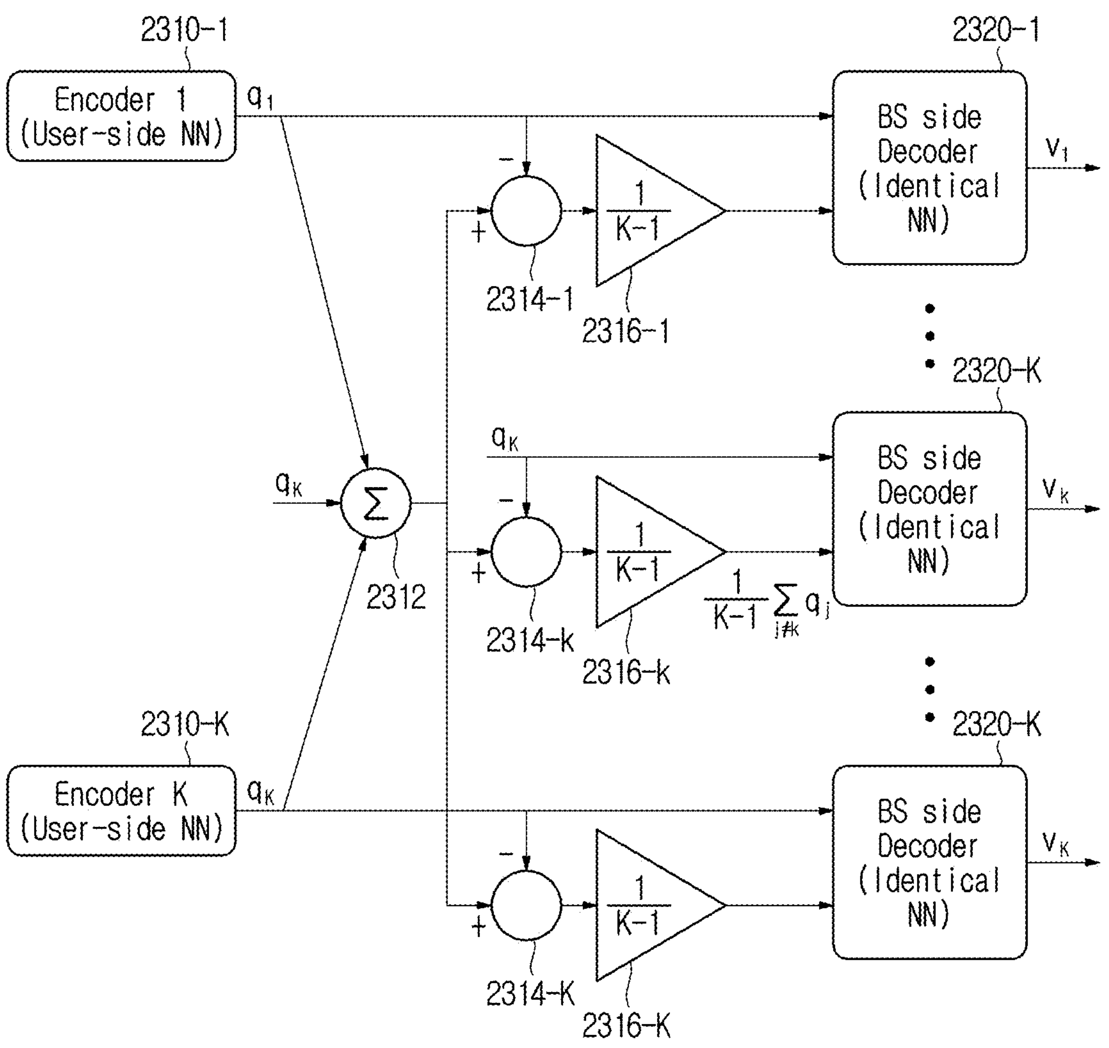
FIG. 23 shows an example of a scalable decoder neural network architecture according to an embodiment of the present disclosure.

An example of the scalable decoder neural network architecture as described above is shown in FIG. 23 below. FIG. 23 shows an example of a scalable decoder neural network architecture according to an embodiment of the present disclosure. Referring to FIG. 23, each of K encoders 2310-1 to 2301-K is included in each UE. When the K encoders 2310-1 to 2301-K output CSI feedback signals (e.g., $q_1, \ldots, q_K$), the CSI feedback signals are summed in an summer 2312, and are provided to subtractors 2314-1 to 2314-K. The value excluding the CSI feedback signal for the UE from the addition result by the summer 2312 is provided to scalers 2316-1 to 2316-K, and the scalers 2316-1 to 2316-K scale the input value based on a set scaling factor (e.g., $$\frac{1}{K-1}).$$

Here, the output (e.g., $q_1, \ldots, q_K$) of each of the K encoders 2310-1 to 2301-K may be understood as a first input signal, and the output of each of the scalers 2316-1 to 2316-K may be understood as a second input signal. Thereafter, each of the decoders 2320-1 to 2320-K generates a precoding vector (e.g., $v_k$) for the UE using the first input signal and the second input signal.

Figure 24:
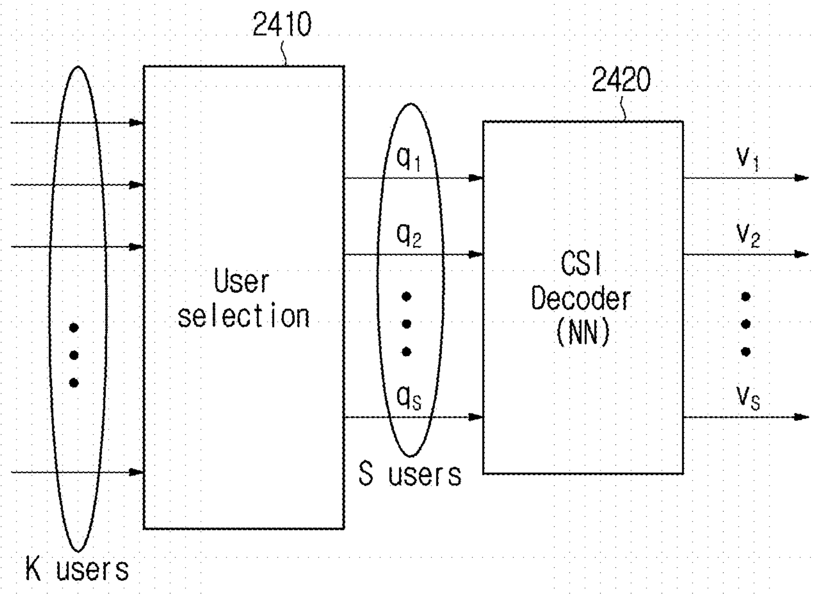
FIG. 24 shows an example of the structure of a device for determining a precoder after selecting users for multiuser precoding according to an embodiment of the present disclosure.

According to various embodiments, a user selection operation may be performed prior to multiuser precoding. FIG. 24 shows an example of the structure of a device for determining a precoder after selecting users for multiuser precoding according to an embodiment of the present disclosure. As shown in FIG. 24, a user selection block 2410 that selects S UEs out of a total of K UEs may be placed prior to a CSI decoder 2420. According to one embodiment, the CSI decoder 2420 may include at least part of the architecture described with reference to FIG. 23. For example, the CSI decoder 2420 may include the summer 2312, the subtractors 2314-1 to 2314-K, the scalers 2316-1 to 2316-K, and the decoders 2320-1 to 2320-K illustrated in FIG. 23.

Referring to FIG. 24, CSI feedback signals (e.g., $q_1 \ldots q_S$) input to the CSI decoder 2420 are re-indexed for the S UEs selected by the user selection block 2410. That is, after user selection, only S UEs are considered rather than K UEs, so new indexing may be applied to S UEs. Accordingly, a variable K, used to describe the multiuser precoding architecture as shown in FIG. 23, may be replaced with the variable S, when user selection is applied. That is, the number of UEs accommodated in the decoder may be expressed as S. In other words, the number of CSI feedback signals input to the CSI decoder 2420 is S, and the CSI decoder 2420 may recognize the number of UEs as S. The CSI decoder 2420 may output the same number of precoding vectors, that is, S precoding vectors. Depending on the type and architecture of the decoder, the S CSI feedback signals input to the CSI decoder 2420 may undergo appropriate pre-processing before being input to the CSI decoder 2420. For example, pre-processing (e.g., summing, subtraction, scaling, etc.) described with reference to FIG. 23 may be performed.

In user selection in multiuser precoding, it is common for there to be signals that a scheduler must obtain from users. For example, a precoding matrix indicator (PMI) and a channel quality indicator (CQI) may be required. Alternatively, channel direction information (CDI) and CQI may be required. However, $q_k$, the feedback signal in end-to-end multiuser precoding that the proposed technology is considering, is different from signals required in general user selection schemes (e.g., CQI) in its nature and physical meaning. That is, the end-to-end multiuser precoding system according to various embodiments may not require feedback on information such as PMI, CDI, CQI, etc. in addition to CSI feedback for determining the precoding matrix. Therefore, in the end-to-end multiuser precoding system according to various embodiments, it can be understood that PMI, CDI, and CQI are replaced by $q_k$, which is a new CSI feedback signal.

That is, the neural network model-based multiuser precoding architecture according to various embodiments does not use feedback such as PMI, CDI, or CQI. Therefore, in a neural network model-based end-to-end multiuser precoding architecture, it is not easy to apply the user selection scheme using PMI, CDI, and CQI without change, and excessive signaling overhead may be caused. Therefore, even if a user selection scheme using PMI, CDI, and CQI is applied, it is difficult to take advantage of the advantages and characteristics of the neural network model-based end-to-end multiuser precoding architecture (e.g., not performing channel estimation for each user). Therefore, it is required to perform user selection using a new feedback signal of the neural network model-based end-to-end multiuser precoding architecture. Accordingly, the present disclosure proposes a user selection technology using CSI feedback signals for the neural network model-based end-to-end multiuser precoding.

In the description of the multiuser precoding technology according to the various embodiments described above, downlink communication was assumed for convenience of explanation. However, according to various embodiments, the above-described multiuser precoding technology may be applied to other types of links, such as uplink and sidelink. Accordingly, the above-described decoder may be included in a base station as well as a UE, a vehicle, a RSU, etc.

Figure 25:
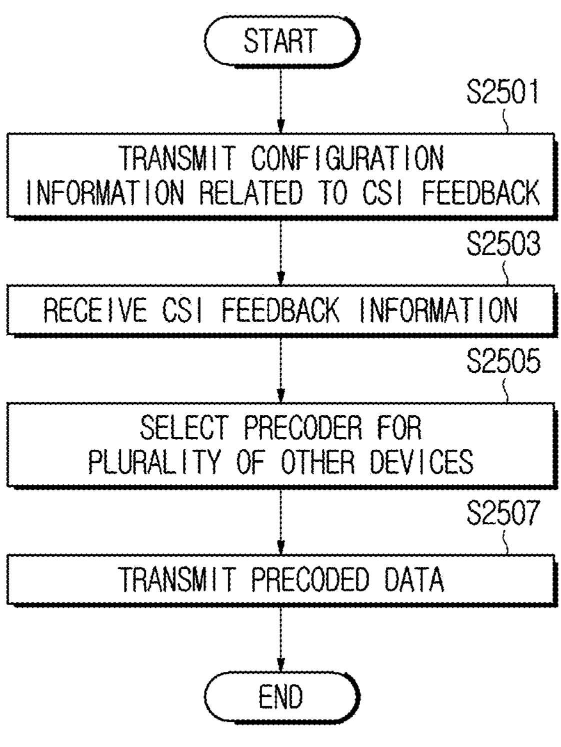
FIG. 25 shows an example of a procedure for performing multiuser precoding according to an embodiment of the present disclosure.

FIG. 25 shows an example of a procedure for performing multiuser precoding according to an embodiment of the present disclosure. FIG. 25 illustrates a method of operating a device (e.g., base station, UE, vehicle, RSU) that communicates with a plurality of other devices.

Referring to FIG. 25, in step S2501, the device transmits configuration information related to CSI feedback. The configuration information may include at least one of information related to reference signals transmitted for channel measurement, information related to a channel measurement operation, or information related to feedback. For example, the configuration information may include at least one of information indicating resources transmitted for reference signals, information related to a sequence of the reference signals, information related to resources for feedback of measurement results, or information related to the format of feedback. Additionally, according to various embodiments, the configuration information may further include information related to a neural network model for generating a CSI feedback signal or information related to a neural network model for interpreting the CSI feedback signal.

In step S2503, the device receives CSI feedback information. The CSI feedback information is received from a plurality of other devices. That is, the device may receive CSI feedback signals from a plurality of other devices. Other devices that have transmitted the CSI feedback signals become candidates for selecting devices participating in multiuser precoding. Therefore, the device that has transmitted the CSI feedback signal is referred to as a 'candidate device', and the device selected for multiuser precoding is referred to as a 'participating device'. Here, the CSI feedback signals are generated based on reference signals transmitted from the device. That is, the device may transmit reference signals according to the configuration information and then receive CSI feedback signals. Here, the other device is a device that performs data communication through a link (e.g., downlink, uplink, sidelink) established with the device, and may be any one of a UE, vehicle, or RSU.

In step S2505, the device selects a precoder for the plurality of other devices. To this end, the device determines participating devices among candidate devices that have transmitted the CSI feedback signals and then determines precoding vectors, that is, a precoding matrix, for the participating devices. For this purpose, the device may use a trained neural network model. According to one embodiment, to determine the participating devices, the device may use the CSI feedback signals received from the candidate devices.

In step S2507, the device transmits precoded data. The device may perform precoding on data to be transmitted to the participating devices using the determined precoding matrix and then transmit the precoded data through a plurality of antennas. Here, precoding includes the operation of multiplying data or modulation symbols by a precoding matrix. Additionally, precoding may be understood as digital precoding, analog precoding, or beamforming.

According to the embodiment shown in FIG. 25, multiuser precoding may be performed. In the embodiment described with reference to FIG. 25, the device that has determined the precoding matrix performs precoding. However, according to another embodiment, at least one other device (e.g., at least one of the participating devices) other than the device that determined the precoding matrix may perform precoding. In this case, step S2507 may be replaced with an operation of transmitting information related to the precoding matrix to at least one other device.

Figure 26:
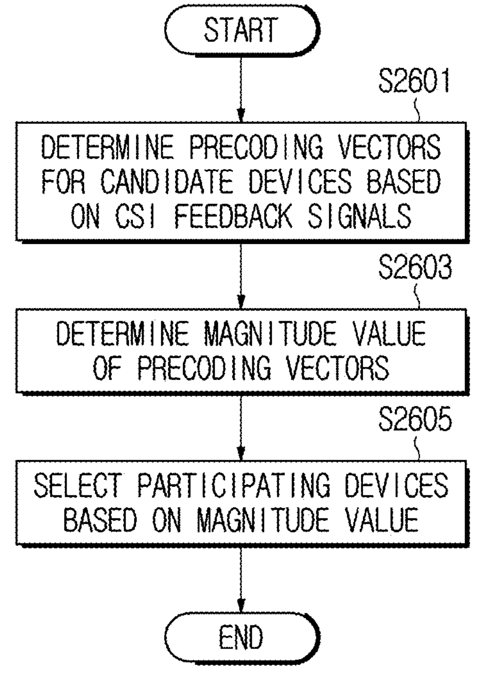
FIG. 26 shows an example of a procedure for selecting users for multiuser precoding according to an embodiment of the present disclosure.

FIG. 26 shows an example of a procedure for selecting users for multiuser precoding according to an embodiment of the present disclosure. FIG. 26 illustrates a method of operating a device (e.g., base station, UE, RSU) that receives CSI feedback signals from candidate devices and generates a precoder for participating devices.

Referring to FIG. 26, in step S2601, the device determines precoding vectors for candidate devices based on CSI feedback signals. Through this, one precoding vector may be determined per candidate device. According to one embodiment, a precoding vector for each candidate device may be determined using a neural network model. Specifically, to determine the precoding vector for a k-th candidate device, the device may input a sum of CSI feedback signals from the remaining candidate devices excluding the k-th candidate device and the CSI feedback signal from the k-th candidate device to a neural network model, and determine a precoding vector for the k-th candidate device as the output of the neural network model.

In step S2603, the device determines the magnitude value of each of the precoding vectors. For example, according to one embodiment, the Euclidean norm may be used as the magnitude of the precoding vector. However, according to other embodiments, other types of parameters may be used as the magnitude value of the precoding vector.

In step S2605, the device selects participating devices based on the magnitude value. According to one embodiment, the device may select some with a relatively large magnitude value from among the candidate devices. Specifically, the operation of selecting some devices may be performed step by step. Here, the number of participating devices may be preset or variable.

Figure 27:
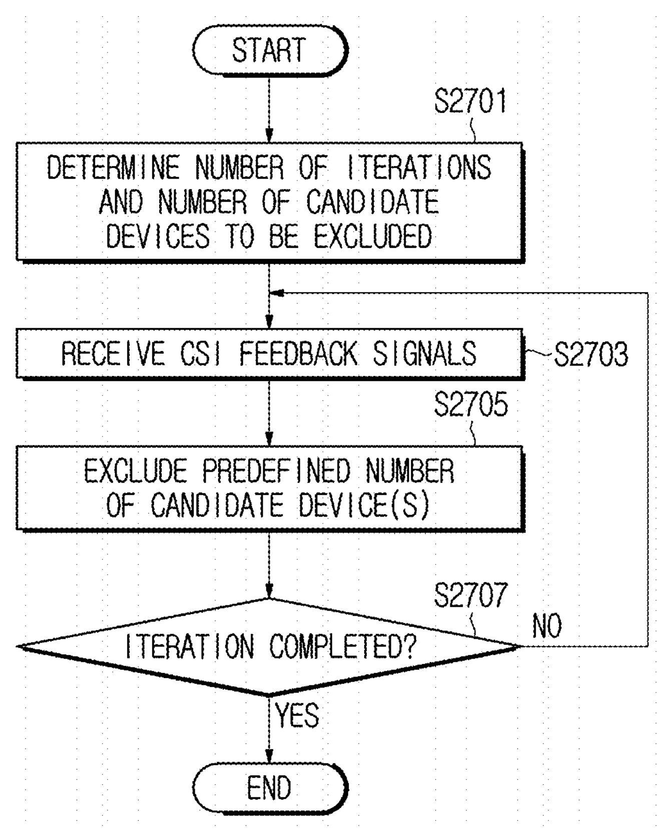
FIG. 27 shows an example of an iterative procedure for selecting users for multiuser precoding according to an embodiment of the present disclosure.

FIG. 27 shows an example of an iterative procedure for selecting users for multiuser precoding according to an embodiment of the present disclosure. FIG. 27 illustrates a method of operating a device (e.g., base station, UE, RSU) that determines participating devices participating in multiuser precoding.

Referring to FIG. 27, in step S2701, the device determines the number of iterations and the number of candidate devices to be excluded. The device determines how many candidate device exclusion operations to perform, or how many candidate device(s) to exclude in each of the iterative exclusion operations. Here, the number of candidate device(s) to be excluded may vary depending on each iteration order. The number of iterations and the number of candidate devices to be excluded may be predefined or adaptively determined. For example, the number of iterations and the number of candidate devices to be excluded may be determined based on the total number of candidate devices, communication capacity, amount of data to be transmitted, etc.

In step S2703, the device receives CSI feedback signals. The device receives CSI feedback signals from a plurality of candidate devices. Prior to receiving the CSI feedback signals, the device may transmit configuration information related to CSI feedback and CSI reference signals.

In step S2705, the device excludes a predefined number of candidate device(s). The device checks the number of candidate device(s) to be excluded corresponding to the current iteration order and excludes as many candidate device(s) as the checked number. To this end, the device may generate precoding vectors for the current remaining candidate devices, determine the magnitude value of each of the precoding vectors, and then exclude as many candidate device(s) with relatively small magnitude values as the checked number.

In step S2707, the device checks whether the iteration is completed. Completion of iteration may be determined based on whether the iteration order has reached the number of iterations. The iteration order is initially initialized to 1 at the start of this procedure. If the iteration has not been completed, the device increases the iteration order by 1 and then returns to step S2705. Once the iteration is completed, the device terminates this procedure.

As described above, according to a neural network model-based multiuser precoding technology, users are selected, and precoding may be performed for the selected users. Hereinafter, embodiments of the above-described user selection will be described in more detail. In the following description, a user refers to a device participating in multiuser precoding, and may be understood as a UE, vehicle, etc.

In this chapter, in the absence of feedback on PMI, CDI, and CQI, a user selection scheme using a new feedback signal $q_k$ in a neural network model-based end-to-end multiuser precoding architecture is proposed. Here, $q_k$ refers to the CSI feedback signal from each user.

The user selection scheme according to various embodiments is an iterative algorithm of a method of calculating the norm (e.g., Euclidean norm) of the precoding vector $v_k$ for each user (e.g., the k-th user) and excluding users with small $\|v_k\|$. Depending on the condition for terminating the iteration, user selection schemes according to various embodiments may be broadly divided into two types. Both schemes assume that CSI feedback signals $\{q_1, q_2, \ldots, q_S\}$ are input to the CSI decoder to output a precoding vector $v_k$ for each user (e.g., the k-th user). In other words, it is assumed that a CSI decoder neural network exists and operates well. Hereinafter, two user selection schemes will be described in detail.

In the following description, a total number of users who must perform selection before selection is completed is expressed as K, the number of selected users is expressed as S, the total number of iterations is expressed as T, and the number of transmit antennas is expressed as M. That is, the two user selection schemes according to various embodiments select S users out of a total of K users during T iterations. CSI feedback signals for the selected S users are input to the CSI decoder, and precoding vectors for the selected S users are obtained. The CSI feedback signals input to the CSI decoder may undergo appropriate preprocessing before being input to the CSI decoder neural network, depending on the type and architecture of CSI decoder.

Before describing the user selection scheme according to various embodiments in detail, the assumed main matters are first mentioned as follows. First of all, $S \leq M < K$ is assumed. In other words, it may be assumed that the total number of users is greater than the number of transmit antennas, and therefore, a situation in which a number of users less than or equal to the number of transmit antennas must be selected. Here, S is the number of CSI feedback signals input to the CSI decoder. That is, the number of users recognized by the CSI decoder is S. Assumptions such as $S \leq M < K$ may be said to be very natural and common. Additionally, it may be assumed that the precoding vectors for some users may be approximated by a zero vector. However, the scope of application of the embodiments described later is not limited to the situations of the above-described assumptions.

The first user selection scheme is performed in a situation where S and T are given as constants. The second user selection scheme is not set as a constant, but is performed in a situation where iteration stops when a specific condition is satisfied, and accordingly, T is also not a fixed value.

1) First User Selection Scheme: Scheme for Selecting Determined S Users Out of the Total of K Users.

Assuming that the total number of users at a specific point in time is K, a set of users with indices of user as elements is defined as $\mathcal{K} = \{1, 2, \ldots, K\}$. Since it is an iterative algorithm, the operations in the i-th iteration are representatively explained. That is, the process of the algorithm in the i-th iteration is explained, and may start from i=1. Therefore, if a total of T iterations are performed, the (i=T)-th iteration will be the last step.

The set of users selected at the end of the i-th step is expressed as $\mathcal{K}_i$, which may be referred to as the 'set of users in the i-th step/iteration'. That is, $\mathcal{K}_i$ is a set of users selected after the i-th iteration is completed. In general, at the i-th iteration, $\mathcal{K}_i$ may be determined by selecting a portion of $\mathcal{K}_{i-1}$, which is the set of users selected in the immediately previous iteration. At this time, the initial user set is defined as $\mathcal{K}_0 = \mathcal{K} = \{1, 2, \ldots, K\}$ and users may be selected from the initial user set when the (i=1)-th iteration, that is, the first iteration, starts. Each iteration (e.g., i-th iteration) largely includes two operations, namely operation ① and operation ②.

In operation ① of the i-th iteration, for all users selected from $\mathcal{K}_{i-1}$, the CSI feedback signal $q_k$ of each user (e.g., the k-th user) is input to the CSI decoder, the precoding vector $v_k$ for the k-th user is obtained, and $\|v_k\|$ is calculated from the precoding vector $v_k$. Here, $\|v_k\|$ is the norm of the precoding vector $v_k$, for example, may be the Euclidean norm. Through the CSI decoder, when determining the precoding vector $v_k$, $q_k$ as well as CSI feedback signals from all users included in $\mathcal{K}_{i-1}$ may be used. This may vary depending on the CSI decoder. For example, when using a scalable decoder as shown in FIG. 23, $q_k$ as well as CSI feedback signals for all users included in $\mathcal{K}_{i-1}$ may be used to obtain the precoding vector $v_k$.

In operation ② of the i-th iteration, $L_i$ users with the smallest $\|v_k\|$ among the users included in $\mathcal{K}_{i-1}$ are excluded. The set excluding the $L_i$ users with the smallest $\|v_k\|$ from $\mathcal{K}_{i-1}$ becomes the user selection result in the i-th iteration. If the set of $L_i$ users with the smallest $\|v_k\|$ among the users included in $\mathcal{K}_{i-1}$ is $\mathcal{L}_i$, it may be expressed as $\mathcal{K}_i=\mathcal{K}_{i-1}-\mathcal{L}_i$. Therefore, the cardinality, that is, the number of elements, for the user set in two consecutive iterations may be expressed in a relationship like $|\mathcal{K}_i|=|\mathcal{K}_{i-1}|-L_i$.

When a total of T iterations are performed, the set of users completed until the last iteration is $\mathcal{K}_T$, and the set of users finally selected is $\mathcal{S}=\mathcal{K}_T$. The number of users who have completed selection by the algorithm may be expressed as $$|\mathcal{S}| = S = K - \Sigma_{i=1}^{T} L_i.$$

How many users are excluded from each iteration (e.g., i-th iteration) and how many iterations are performed in total may vary depending on the detailed design. That is, a sequence $L_i$ and a natural number $T\in\mathbb{N}$ may be selected as design parameters of the proposed technology. The sequence $L_i$ indicates how many users to exclude from each iteration (e.g., i-th iteration), and the natural number $T\in\mathbb{N}$ is design parameters that indicates how many iterations to perform in total. However, the sequence $L_i$ and the natural number $T\in\mathbb{N}$ must satisfy $$\Sigma_{i=1}^{T} L_i = K - S$$

Since the proposed technique aims to select the determined S users out of a total of K users, K−S may be understood as being given as a constant. Accordingly, the natural number T and sequence $L_i$ that satisfy $$\Sigma_{i=1}^{T} L_i = K - S$$

may be determined. In the proposed scheme, the number of iterations may be determined by design.

When the determined S users are selected from a total of K users through the above-described operations, CSI feedback signals for the S users are input to the CSI decoder, and precoding vectors for the selected S users may finally be obtained.

[Table 2] below shows the first user selection scheme described above.

TABLE 2

| First user selection scheme (select S users out of K) | |
|---|---|
| Definition | $\mathcal{K}_i$: user set of i-th iteration |
| | Initial user set: $\mathcal{K}_0 = \mathcal{K} = \{1, 2, \ldots, K\}$ |
| Iteration i | ①calculate $\|v_k\|\ \forall_{k\in\mathcal{K}_{i-1}}$ by using CSI decoder |
| (from i = 1) | ②exclude $L_i$ users of lowest $\|v_k\|$ values from $K_{i-1}$ |
| | √ $\mathcal{L}_i$: Set of $L_i$ users of lowest $\|v_k\|$ values from $K_{i-1}$ |
| | $\mathcal{K}_i = \mathcal{K}_{i-1} - \mathcal{L}_i$ |
| | √ $\|\mathcal{K}_i\| = \|\mathcal{K}_{i-1}\| - L_i$ |
| Result | $\mathcal{S}$: set of selected users |
| | $\mathcal{S} = \mathcal{K}_T$ (user set of final step) |
| | √ $\|\mathcal{S}\| = S = K - \Sigma_{i=1}^{T} L_i$ |
| Design Parameters | Sequence $(L_i)$ and $T \in \mathbb{N}$ |
| | √ satisfying $\sum_{i=1}^{K} L_i = K - S$ |

As shown in [Table 2], at each iteration, a determined number (e.g., $L_i$) of user(s), selected in ascending order of Euclidean norms, are excluded from the users corresponding to the precoding vector with the smallest Euclidean norm.

2) Second User Selection Scheme: Scheme in which the Number S of Selected Users Out of the Total of K Users May be Determined Differently Depending on the Situation.

In the case of the second user selection scheme, the number S of users finally selected may be determined differently depending on the situation. Assuming that the total number of users at a specific point in time is K, a user set containing the indices of users as elements may be defined as $\mathcal{K}=\{1, 2, \ldots, K\}$. The operations in the i-th iteration are representatively explained. That is, the process of the algorithm in the i-th iteration is explained, and may start from i=1. Therefore, if a total of T iterations are performed the (i=T)-th iteration will be the last step.

The set of users selected at the end of the i-th step is expressed as $\mathcal{K}_i$, which may be referred to as the 'set of users in the i-th step/iteration'. That is, $\mathcal{K}_i$ is a set of users selected after the i-th iteration is completed. In general, at the i-th iteration, $\mathcal{K}_i$ may be determined by selecting a portion of $\mathcal{K}_{i-1}$, which is the set of users selected in the immediately previous iteration. At this time, the initial user set is defined as $\mathcal{K}_0=\mathcal{K}=\{1, 2, \ldots, K\}$ and users may be selected from the initial user set when the (i=1)-th iteration, that is, the first iteration, starts. Each iteration (e.g., i-th iteration) largely includes two operations, namely operation ① and operation ②.

In operation ① of the i-th iteration, for all users selected from $\mathcal{K}_{i-1}$, the CSI feedback signal $q_k$ of each user (e.g., the k-th user) is input to the CSI decoder, the precoding vector $v_k$ for the k-th user is obtained, and $\|v_k\|$ is calculated from the precoding vector $v_k$. Here, $\|v_k\|$ is the norm of the precoding vector $v_k$, for example, may be the Euclidean norm. Through the CSI decoder, when determining the precoding vector $v_k$, $q_k$ as well as CSI feedback signals from all users included in $\mathcal{K}_{i-1}$ may be used. This may vary depending on the CSI decoder. For example, when using a scalable decoder as shown in FIG. 23, $q_k$ as well as CSI feedback signals for all users included in $\mathcal{K}_{i-1}$ may be used to obtain the precoding vector $v_k$.

In operation ② of the i-th iteration, among the users included in $\mathcal{K}_{i-1}$, all users with k satisfying $\|v_k\|\le\epsilon_i$ as an index are excluded. The set excluding users satisfying $\|v_k\|\le\epsilon_i$ from $\mathcal{K}_{i-1}$ becomes the user selection result in the i-th iteration. Among the users included in $\mathcal{K}_{i-1}$, the set of users with k satisfying $\|v_k\|\le\epsilon_i$ as an index may be expressed as $\mathcal{K}_i=\mathcal{K}_{i-1}-\mathcal{L}_i$. Here, a sequence $\epsilon_i$ is the design parameter of this algorithm. Depending on how the sequence $\epsilon_i$ is designed, the results of the user's selection of the algorithm may vary.

If the set of finally selected users is $\mathcal{S}$, when a total of T iterations are performed, the set of users completed until the last iteration is $\mathcal{K}_T$, and thus $\mathcal{S}=\mathcal{K}_T$. However, unlike the first user selection scheme, T is not a fixed value. Since T is not determined at the design stage of the algorithm, an appropriate termination criterion is needed to stop iteration. For example, if there is no user k satisfying $\|v_k\| \le \epsilon_i$, the iteration may be terminated. Alternatively, if iterations in which there is no user k satisfying $\|v_k\| \le \epsilon_i$ occur continuously the number of times determined as a design parameter, the iteration may be terminated.

Just as the number T of iterations is not determined during design, the number of elements in the set $\mathcal{S}$ is also not determined in advance before the algorithm is executed. Even if an algorithm designed with the same design parameters is performed, the number S of selected users may vary depending on the situation. In other words, even if the sequence $\epsilon_i$ and termination criterion are the same, S is not fixed and may change depending on the results of the algorithm. This is a different characteristic from the first user selection scheme, which has the characteristic that the values of T and S are determined when the design parameters are the same. [Table 3] below shows the second user selection scheme described above.

TABLE 3

| Second user selection scheme (select S users among K) | |
|---|---|
| Definition | • $\mathcal{K}_i$: user set of i-th iteration<br>•Initial user set: $\mathcal{K}_0=\mathcal{K}=\{1, 2, \ldots, K\}$ |
| Iteration i (from i=1) | ① calculate $\|v_k\|\ \forall_{k \in \mathcal{K}_{i-1}}$ by using CSI decoder<br>② exclude from $K_{i-1}$ the users that satisfy the following condition<br>• $\|v_k\| \le \in_i$<br>√ $\mathcal{L}_i$: set of user satisfying $\|v_k\| \le \in_i$ from $\mathcal{K}_{i-1}$<br>• $\mathcal{K}_i=\mathcal{K}_{i-1}-\mathcal{L}_i$ |
| Result | • $\mathcal{S}$ : set of selected users<br>•Iteration end when<br>√ No user satisfying $\|v_k\| \le \in_i$ exists<br>• $\mathcal{S}=\mathcal{K}_T$ (user set of final iteration)<br>√ Neither T nor S = $\|\mathcal{S}\|$ is a fix value any more |
| Design Parameters | •Sequence ($\in_i$) |

As shown in [Table 3], the iterative operation of excluding user(s) may be terminated when iterations in which a user corresponding to a precoding matrix with a Euclidean norm less than or equal to a threshold (e.g., $\xi_i$) does not occur are observed continuously a predefined number of times.

According to the user selection schemes according to the various embodiments described above, user selection is possible without additional signaling by utilizing only the new CSI feedback signal of the end-to-end precoding system. That is, according to various embodiments, users may be selected based on magnitude values of precoding vectors determined based on CSI feedback signals. However, according to other embodiments, in addition to the magnitude value of the precoding vector, other information may be used together for scheduling operations, especially user selection.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method of operating a device for performing multiuser precoding in a wireless communication system, the method comprising:

transmitting configuration information related to channel state information (CSI) feedback to candidate devices;

transmitting reference signals corresponding to the configuration information;

receiving CSI feedback signals from the candidate devices;

determining precoding vectors for participating devices that are at least part of the candidate devices;

performing precoding for data to the participating devices using the precoding vectors; and transmitting the precoded data, wherein the participating devices are determined based on information including magnitude values of precoding vectors for the candidate devices determined by a decoder neural network based on the CSI feedback signals generated by an encoder neural network.

2. The method of claim 1, wherein the decoder neural network takes as input a sum of CSI feedback signals from the remaining candidate devices except a k-th candidate device and a CSI feedback signal from the k-th candidate device, in order to determine a precoding vector for the k-th candidate device.

3. The method of claim 1, wherein the configuration information includes at least one of information related to a neural network model for generating the CSI feedback signals or information related to a neural network model for interpreting the CSI feedback signal.

4. The method of claim 1, further comprising:

determining the participating devices from the candidate devices based on the CSI feedback signals.

5. The method of claim 4, wherein the determining the participating devices comprises:

determining a first precoding matrix for the candidate devices belonging to a first set based on the CSI feedback signals;

determining a second set by excluding at least one candidate device from the first set based on the magnitude values of the precoding vectors belonging to the first precoding matrix;

determining a second precoding matrix for candidate devices belonging to the second set; and determining a third set by excluding at least one candidate device from the second set based on the magnitude values of the precoding vectors belonging to the second precoding matrix.

6. The method of claim 5, wherein a first number of at least one candidate device is excluded from the first set, wherein a second number of at least one candidate device is excluded from the second set, and wherein the first number and the second number are preset.

7. The method of claim 6, wherein at least one candidate device excluded from the first set comprises the first number of at least one candidate device selected in an ascending order of the magnitude value from a candidate device corresponding to a precoding vector with a smallest magnitude value.

8. The method of claim 5, wherein at least one candidate device corresponding to a precoding matrix with a magnitude value equal to or less than a threshold is excluded from the first set and the second set.

9. The method of claim 8, wherein an iterative operation of excluding the at least one candidate device is terminated when iterations in which at least one candidate device corresponding to the precoding matrix with the magnitude value equal to or less than the threshold does not occur is observed continuously a predefined number of times.

10. The method of claim 1, wherein the device is a base station, and wherein the candidate devices comprise user equipments (UEs) performing downlink communication with the device.

11. The method of claim 1, wherein the device is a user equipment (UE), a vehicle or a road side unit (RSU), and wherein the candidate devices comprise user equipments (UEs) performing sidelink communication with the device.

12. A communication device comprising:

at least one processor; and at least one computer memory connected to the at least one processor and configured to store instructions that direct operations as executed by the at least one processor, wherein the operations comprise:

transmitting configuration information related to channel state information (CSI) feedback to candidate devices;

transmitting reference signals corresponding to the configuration information;

receiving CSI feedback signals from the candidate devices;

determining precoding vectors for participating devices that are at least part of the candidate devices;

performing precoding for data to the participating devices using the precoding vectors; and transmitting the precoded data, wherein the participating devices are determined based on information including magnitude values of precoding vectors for the candidate devices determined by a decoder neural network based on the CSI feedback signals generated by an encoder neural network.

13. A device for performing multiuser precoding in a wireless communication system, the device comprising:

a transceiver; and a processor connected to the transceiver, wherein the processor is configured to:

transmit configuration information related to channel state information (CSI) feedback to candidate devices;

transmit reference signals corresponding to the configuration information;

receive CSI feedback signals from the candidate devices;

determine precoding vectors for participating devices that are at least part of the candidate devices;

perform precoding for data to the participating devices using the precoding vectors; and transmit the precoded data, wherein the participating devices are determined based on information including magnitude values of precoding vectors for the candidate devices determined by a decoder neural network based on the CSI feedback signals generated by an encoder neural network.

14. The device of claim 13, wherein the decoder neural network takes as input a sum of CSI feedback signals from the remaining candidate devices except a k-th candidate device and a CSI feedback signal from the k-th candidate device, in order to determine a precoding vector for the k-th candidate device.

15. The device of claim 13, wherein the configuration information includes at least one of information related to a neural network model for generating the CSI feedback signals or information related to a neural network model for interpreting the CSI feedback signal.

16. The device of claim 13, further comprising:

determining the participating devices from the candidate devices based on the CSI feedback signals.

17. The device of claim 16, wherein the determining the participating devices comprises:

determining a first precoding matrix for the candidate devices belonging to a first set based on the CSI feedback signals;

determining a second set by excluding at least one candidate device from the first set based on the magnitude values of the precoding vectors belonging to the first precoding matrix;

determining a second precoding matrix for candidate devices belonging to the second set; and determining a third set by excluding at least one candidate device from the second set based on the magnitude values of the precoding vectors belonging to the second precoding matrix.

18. The device of claim 17, wherein a first number of at least one candidate device is excluded from the first set, wherein a second number of at least one candidate device is excluded from the second set, and wherein the first number and the second number are preset.

19. The device of claim 13, wherein the device is a base station, and wherein the candidate devices comprise user equipments (UEs) performing downlink communication with the device.

20. The device of claim 13, wherein the device is a user equipment (UE), a vehicle or a road side unit (RSU), and wherein the candidate devices comprise user equipments (UEs) performing sidelink communication with the device.

* * * * *